(12) United States Patent
James et al.

(10) Patent No.: US 9,233,757 B2
(45) Date of Patent: Jan. 12, 2016

(54) NACELLE

(75) Inventors: Norman John James, San Diego, CA (US); Alan Binks, San Diego, CA (US); Michael J Layland, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 681 days.

(21) Appl. No.: 13/294,090

(22) Filed: Nov. 10, 2011

(65) Prior Publication Data

US 2013/0118599 A1     May 16, 2013

(51) Int. Cl.
| | | |
|---|---|---|
| *B64D 27/00* | (2006.01) | |
| *B64D 29/00* | (2006.01) | |
| *B64D 29/06* | (2006.01) | |

(52) U.S. Cl.
CPC ............... *B64D 29/00* (2013.01); *B64D 29/06* (2013.01); *Y10T 137/0536* (2015.04)

(58) Field of Classification Search
CPC ........ B64D 29/00; B64D 29/06; B64D 33/04; F02K 1/60; F02K 1/54; F02K 1/32; F02K 1/56; F02K 1/566
USPC .......................... 244/54, 55, 110 B; 60/226.2; 239/265.19, 265.25
See application file for complete search history.

(56) References Cited

U.S. PATENT DOCUMENTS

| | | | |
|---|---|---|---|
| 3,941,313 A * | 3/1976 | Jumelle ................... 239/265.29 |
| 3,960,345 A | 6/1976 | Lippert, Jr. |
| 4,147,028 A | 4/1979 | Rodgers |
| 4,449,683 A | 5/1984 | Gratzer et al. |
| 4,527,391 A * | 7/1985 | Marx et al. ................... 60/226.2 |
| 4,940,196 A | 7/1990 | Lardellier |
| 5,035,379 A | 7/1991 | Hersen et al. |
| 5,730,393 A * | 3/1998 | Hatrick et al. ............ 244/110 B |
| 5,863,014 A | 1/1999 | Standish |
| 6,340,135 B1 | 1/2002 | Barton |
| 6,966,524 B2 | 11/2005 | Stuhr |
| 7,090,165 B2 | 8/2006 | Jones et al. |
| 7,334,447 B1 * | 2/2008 | Kulkarni et al. ................ 72/350 |
| 2010/0132332 A1 | 6/2010 | Vauchel |
| 2010/0287910 A1 | 11/2010 | Joret et al. |
| 2010/0307130 A1 * | 12/2010 | Marley ........................ 60/226.2 |
| 2011/0146230 A1 * | 6/2011 | LaChapelle et al. ......... 60/226.2 |

OTHER PUBLICATIONS

Office Action dated Aug. 10, 2015 in Chinese Application No. 201210452128.2.

* cited by examiner

*Primary Examiner* — Gerald L Sung
(74) *Attorney, Agent, or Firm* — Snell & Wilmer, LLP

(57) ABSTRACT

A nacelle is configured to be coupled to an underside of a wing so as to form a clearance space therebetween. The nacelle includes at least a first cowling which at least partially defines an inlet of the nacelle and which at least partially defines an outlet of the nacelle. The first cowling can include a unitary portion that extends continuously from the inlet to the outlet. The first cowling can also include a flattened surface.

10 Claims, 26 Drawing Sheets

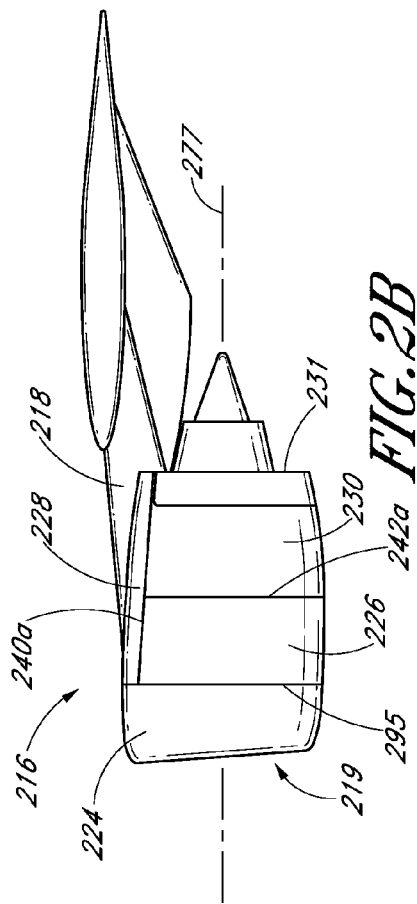
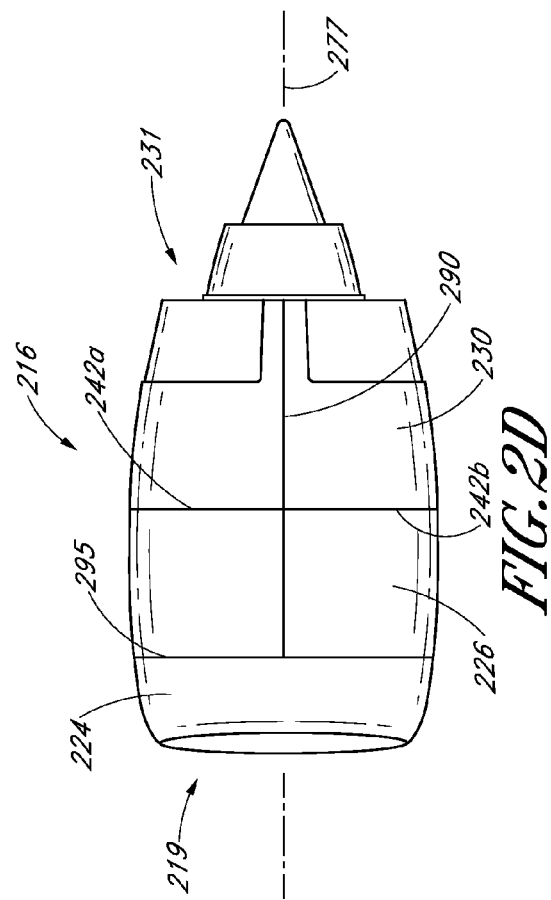
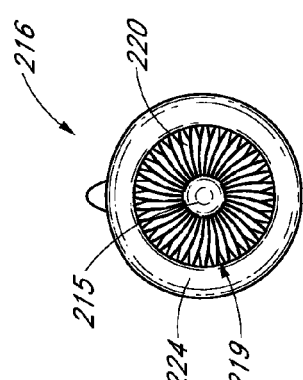
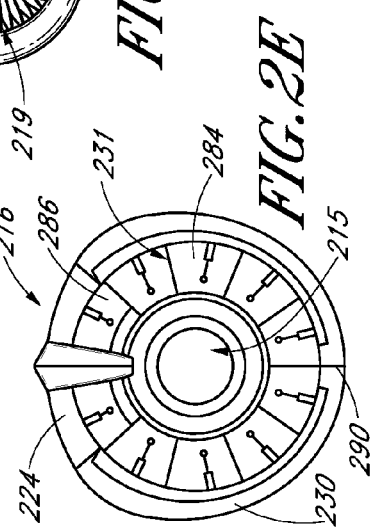
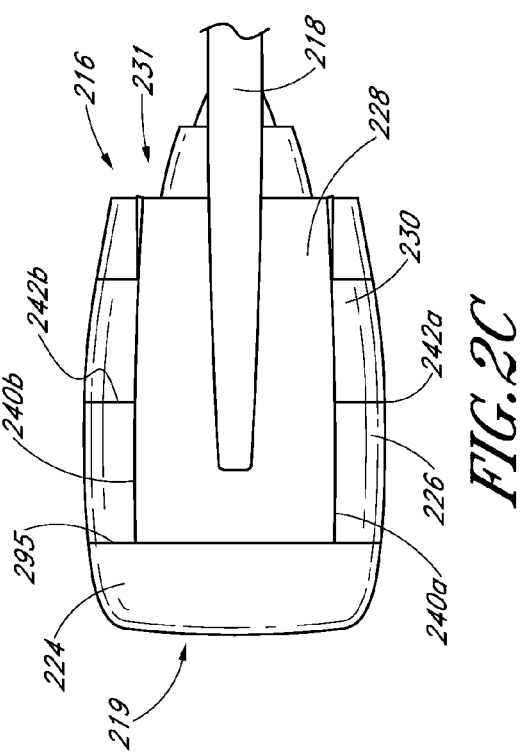

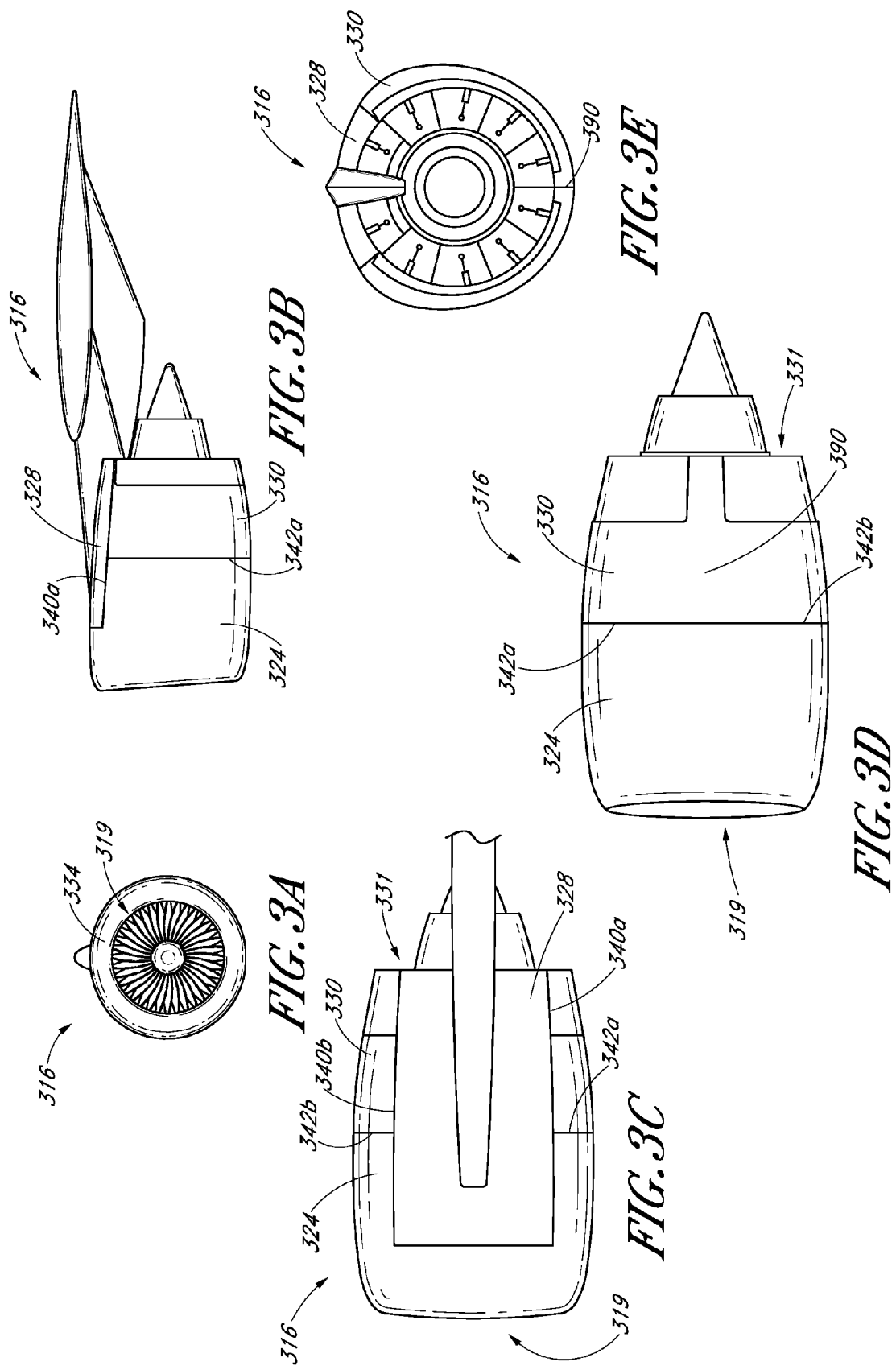

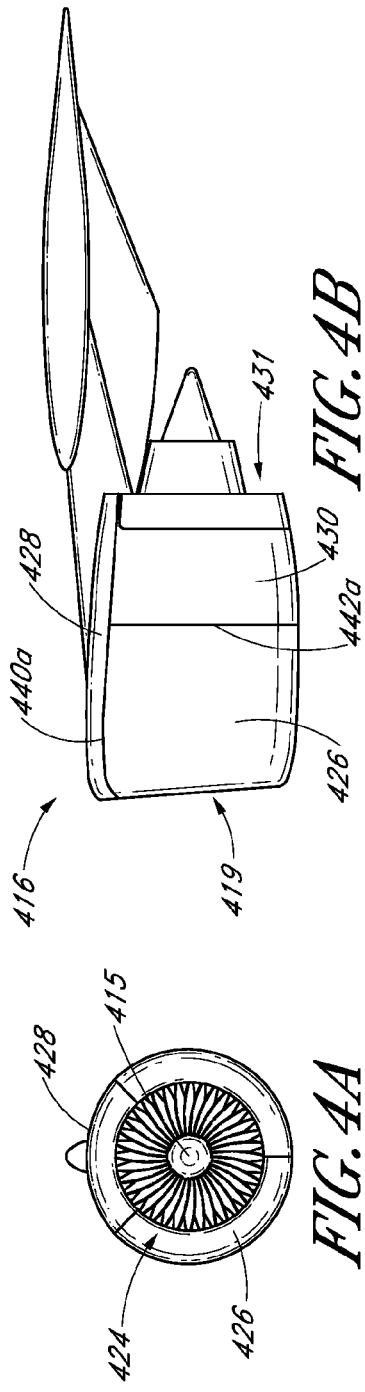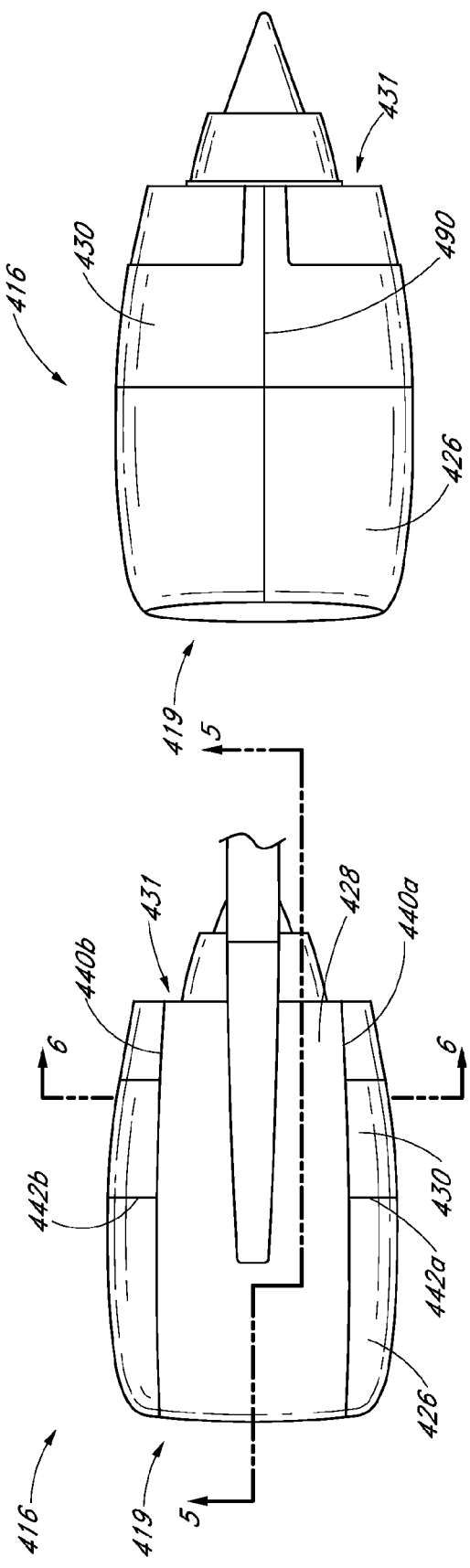

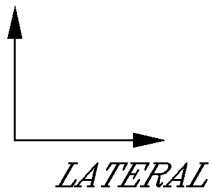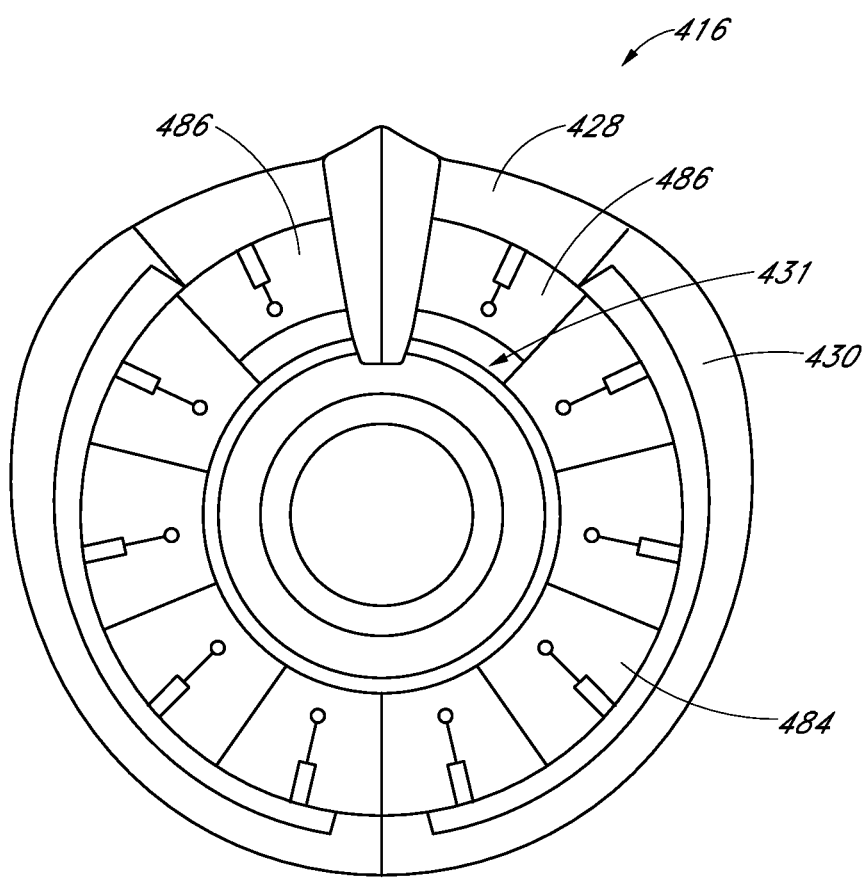
FIG. 11

NACELLE

BACKGROUND

1. Field

This application relates generally to engine nacelles.

2. Description of the Related Technology

A nacelle is a casing or housing that holds an engine and/or other equipment on an aircraft. Nacelles are often coupled to an underside of a wing, for example, by a pylon. At present, nacelles are typically made from several pieces or cowlings which meet at lines, seams, or junctures referred to as splits. Nacelle splits introduce perturbations to air passing over the nacelle and such perturbations can increase drag forces on other surfaces of the aircraft, e.g., a wing disposed above the nacelle. Thus, providing a nacelle that minimizes drag forces on the aircraft remains a significant challenge in aeronautical engineering applications.

SUMMARY

The devices, systems, and methods of the present invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "DETAILED DESCRIPTION OF THE PREFERRED EMBODIMENTS" one of ordinary skill in the art will appreciate how the features of this invention provide advantages as compared to existing nacelles.

One aspect of the present invention is a nacelle having an inlet, an outlet, and a longitudinal axis extending therebetween. The nacelle comprises a first cowling at least partially defining the inlet and at least partially defining the outlet. The first cowling comprises a unitary portion that extends from the inlet to the outlet. The nacelle also comprises a second cowling at least partially defining the outlet. The second cowling is configured to translate relative to the first cowling.

Another aspect of the present invention is a nacelle configured to be coupled to an underside of a wing so as to form a clearance space therebetween. The nacelle comprises a lip which defines an inlet. The nacelle also comprises a first cowling disposed adjacent to the lip. The first cowling has an upper surface with at least two different radii of curvature in a plane perpendicular to the longitudinal axis. The upper surface is adjacent to the underside of the wing.

Yet another aspect of the present invention is a nacelle configured to be coupled to an underside of a wing so as to form a clearance space therebetween. The nacelle has a longitudinal axis and comprises a top cowling, an outlet cowling, and a cascade. The top cowling at least partially defines an inlet of the nacelle. The outlet cowling is configured to translate in a longitudinal direction relative to the top cowling between at least a first configuration and a second configuration. The outlet cowling and the top cowling at least partially define an outlet of the nacelle at least when the outlet cowling is in the first configuration. The cascade is fixed longitudinally relative to the top cowling. At least a first portion of the cascade is disposed between the outlet cowling and the longitudinal axis when the outlet cowling is in the first configuration such that the first portion of the cascade is exposed when the outlet cowling is in the second configuration.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. The various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process.

FIG. 2A is a front view of a nacelle according to a preferred embodiment of the present invention.

FIG. 2B is a side view of the nacelle of FIG. 2A relative to a wing.

FIG. 2C is a top view of the nacelle of FIG. 2A.

FIG. 2D is a bottom view of the nacelle of FIG. 2A.

FIG. 2E is a rear view of the nacelle of FIG. 2A.

FIG. 3A is a front view of a nacelle according to another embodiment.

FIG. 3B is a side view of the nacelle of FIG. 3A relative to a wing.

FIG. 3C is a top view of the nacelle of FIG. 3A.

FIG. 3D is a bottom view of the nacelle of FIG. 3A.

FIG. 3E is a rear view of the nacelle of FIG. 3A.

FIG. 4A is a front view of a nacelle according to another embodiment.

FIG. 4B is a side view of the nacelle of FIG. 4A relative to a wing.

FIG. 4C is a top view of the nacelle of FIG. 4A.

FIG. 4D is a bottom view of the nacelle of FIG. 4A.

FIG. 11 is a rear view of the nacelle of FIG. 9 in the reverse thrust configuration.

DETAILED DESCRIPTION OF THE PREFERRED EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments of the invention disclosed herein relate to nacelles that incorporate top cowlings formed without splits. Such cowlings can reduce air flow perturbations over the nacelle that result in drag forces on the underside of an associated wing. Additionally, embodiments of nacelles disclosed herein can incorporate non-circular or flattened top cowlings that do not have splits. That is to say, embodiments of nacelles disclosed herein can have a non-circular profile. Such a profile may advantageously reduce drag forces on a corresponding aircraft by providing a smoother passage underneath an associated wing for topside airflow. Thus, nacelles disclosed herein can have profiles that result in less drag on a corresponding aircraft than existing aircraft nacelles. Moreover, a nacelle having a flattened top cowling can increase clearance underneath an associated wing by allowing such a nacelle to be disposed closer to the wing. Shifting the nacelle in a transverse direction toward the wing increases the clearance between the nacelle and the tarmac or runway. This shift also allows the fitment of engines that have a higher bypass ratio (larger maximum diameter) to a wing while maintaining the necessary clearance between the bottom of the nacelle and the tarmac or runway. In some implementations, providing a higher bypass ratio engine can reduce thrust specific fuel consumption for an aircraft and improve overall fuel efficiency. Hence, the nacelles disclosed herein can provide several advantages over existing nacelles.

Figure 1:
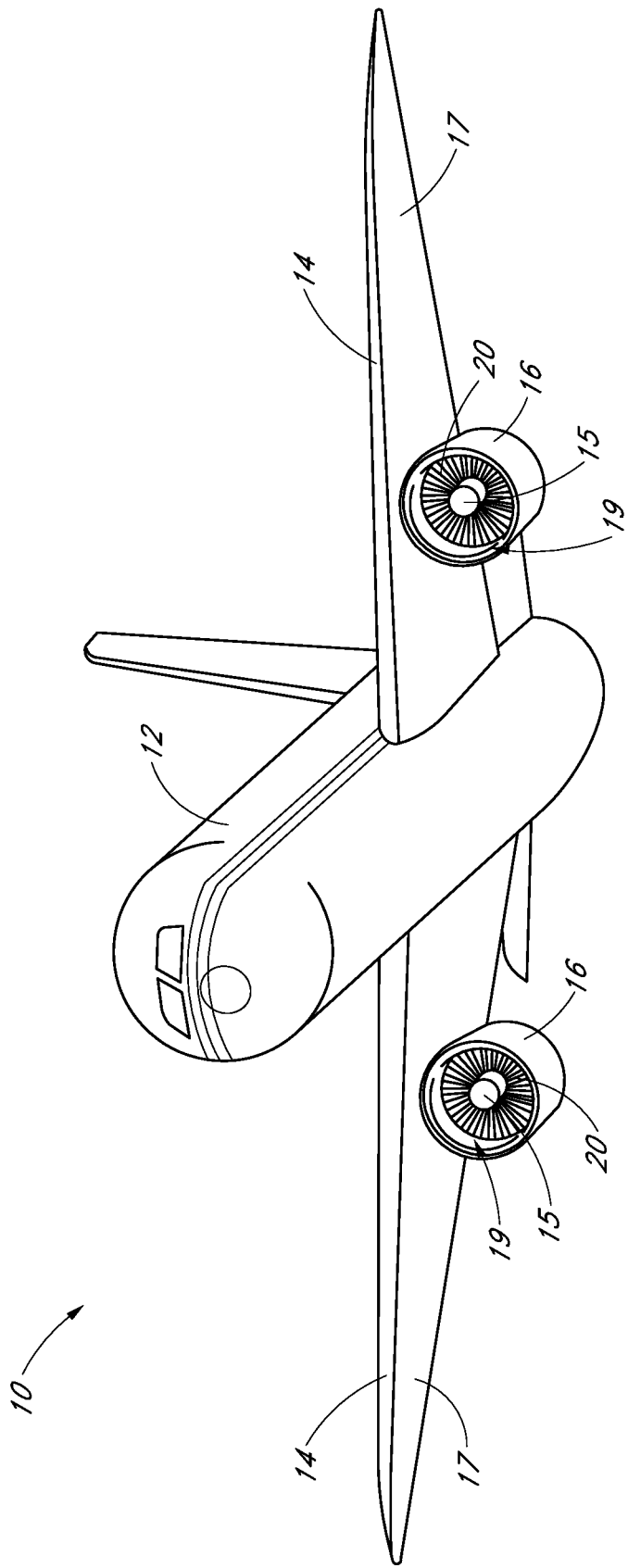
FIG. 1 is a perspective view of an aircraft incorporating a nacelle.

FIG. 1 is a perspective view of an aircraft 10 having a fuselage 12 and a pair of wings 14 extending laterally from the fuselage 12. A nacelle 16 is coupled to an underside of each wing 14. Although not illustrated in FIG. 1, in some embodiments, each nacelle 16 is coupled to a wing by a pylon, or any other suitable structure capable of coupling a load to a wing.

Each nacelle 16 houses an aircraft engine 15, for example, a high bypass ratio engine, which receives air through a fan 20 disposed near an inlet 19 of the nacelle 16, combusts the received air with fuel within a combustion chamber, and provides an exhaust jet through a rear-facing nozzle to propel the aircraft 10 in a forward direction. Additionally, high bypass ratio engines also receive a substantial amount of air through the inlet 19 of the nacelle 16 that is passed over or bypasses the engine 15 to provide additional thrust. The bypass air is combined with the exhaust jet and improves fuel efficiency and engine noise. In some embodiments, the nacelle 16 can include a variable area fan nozzle cowling configured to vary an outlet area through which the exhaust jet and bypass air can pass through. Because a high bypass ratio engine can require a substantial amount of clearance between an exterior surface of the engine 15 and the interior surface of the nacelle 16, such engines can require a larger nacelle that must be disposed near the underside 17 of the wing 14 in order to provide for necessary clearance between the nacelle and a landing surface such as a runway.

Still referring to FIG. 1, during flight, air flows through the inlet 19 of each nacelle 16 as well as over the outer surfaces of each nacelle 16. The outer surfaces of the nacelle 16 may be formed by various cowlings that are joined together to form the nacelle. Surface irregularities on the outside of each cowling component can disrupt air flowing over the nacelle and lead to downstream drag as these disruptions may interact with other surfaces of the aircraft 10. For example, a flow of air over a nacelle 16 may be disturbed by an external split or juncture between two or more cowlings or components of the nacelle 16. The resulting disruption may increase drag on the underside 17 of an associated wing 14. Air flow disruptions resulting from the outer surfaces of a nacelle 16 may be particularly problematic when the nacelle 16 is disposed relatively near to the underside 17 of the wing 16 (e.g., in high bypass ratio engine aircrafts). Further, even without air flow disruptions caused by irregularities (e.g., splits or junctures) on an outer surface of a nacelle 16, the profile of a nacelle 16 can change the amount of drag on the aircraft 10. For example, the space between the nacelle 16 and the underside 17 of the wing 14 can be shaped such that turbulent air flow occurs therebetween. That is to say, in some embodiments, the curved shape of the top cowling of the nacelle 16 may impede achieving laminar flow between the nacelle 16 and the wing 14.

To assist in the description of the nacelles described below with reference to the figures, the following coordinate terms are used, consistent with the coordinate axes illustrated. A "longitudinal axis" is generally parallel to an axis of the nacelle that extends between the inlet and outlet of the nacelle. A "lateral axis" is normal to the longitudinal axis and is generally parallel to a wing associated with the nacelle. A "transverse axis" extends normal to both the longitudinal and lateral axes. In addition, as used herein, "the longitudinal direction" refers to a direction substantially parallel to the longitudinal axis; "the lateral direction" refers to a direction substantially parallel to the lateral axis; and "the transverse direction" refers to a direction substantially parallel to the transverse axis. The terms "upper," "lower," "top," "bottom," "underside," "upperside" and the like, which may be used to describe nacelles and related components in the discussion below, are used in reference to the illustrated orientation of embodiments. For example, the term "upperside" is used to describe the portion of a nacelle that is disposed above an engine housed within the nacelle. The term "underside" is used to describe the portion of the nacelle that is located below the plane that passes through the longitudinal axis of the nacelle.

FIGS. 2A-2E illustrate an embodiment of a nacelle 216. FIG. 2A schematically depicts a front view of the nacelle 216 and an engine 215 housed therein. The engine 215 is coupled with a fan 220 that is disposed near the front side of the nacelle 216 to draw air into the nacelle through an inlet 219. As described in further detail below, the air drawn in through the inlet 219 may be expelled through the outlet 231 of the nacelle 216 and/or combusted with fuel to provide a forward thrust for an associated aircraft. Additionally, air can be expelled through a thrust reverser arrangement to produce a backwards (e.g., reverse) thrust. The nacelle 216 can be coupled to an aircraft by a pylon 218 disposed on the upperside of the nacelle. For example, the nacelle 216 can be coupled to the underside of an aircraft wing such that the engine 215 provides forward and reverse thrust capabilities to the aircraft.

Still referring to FIGS. 2A-2E, the nacelle 216 has an inlet lip or noselip 224. An inlet cowling 226 and a top cowling 228 are coupled to the inlet lip 224. As illustrated, the inlet lip 224 can be substantially ring-shaped to define the inlet 219 of the nacelle. Additionally, as discussed below, the inlet lip 224 can have a circular and/or irregular shape such that a distance between a first outer portion (e.g., the top side) of the inlet lip 224 and the longitudinal axis 277 of the nacelle 216 is different than a distance between a second outer portion (e.g., the bottom side) of the inlet lip and the longitudinal axis 277 of the nacelle 216. In some embodiments, the inlet cowling 226 defines a C-shaped portion that forms a channel with the top cowling 228. For example, the top cowling 228 can span between 10° and 180° of the circumference of the nacelle 216, or more, and the inlet cowling 226 can span the remaining portion of the nacelle 216 so as to form a channel that receives air that passes through the inlet 219 and the inlet lip 224. In some embodiments, the top cowling 228 spans between about 20° and about 90° of the nacelle 216 and the inlet cowling 226 spans the remaining portion of the nacelle 216.

FIGS. 2B and 2C illustrate a side view and a top view, respectively, of the nacelle 216. As can be seen in these figures, the nacelle 216 includes an outlet cowling 230 disposed adjacent to the inlet cowling 226. Transverse splits 242a, 242b are disposed between the inlet cowling 226 and the outlet cowling 230. A transverse split 295 is also disposed between the inlet lip 224 and the top cowling 228 and the inlet cowling 226. Additionally, the nacelle 216 includes a pair of longitudinally extending splits 240a, 240b disposed between the top cowling 228 and the inlet and outlet cowlings 226, 230. In other words, the longitudinally extending splits 240a, 240b extend from the inlet lip 224 to the outlet 231. As discussed above, such splits 240a, 240b, 242a, 242b can introduce perturbations to a flow of air that passes over the nacelle 216 and the resulting perturbations can flow downstream. However, as shown in FIGS. 2B and 2C, the top cowling 228 does not include any transverse-extending splits or junctures between the inlet lip 224 and the outlet 231 of the nacelle 216. For example, the top cowling 228 can include a unitary or homogeneous portion that extends continuously in the longitudinal direction from the inlet lip 224 to the outlet 231 of the nacelle 216. Thus, a flow of air passing over the outer surface of the top cowling 228 of the nacelle 216 is less likely to form perturbations and/or disturbances stemming from splits in the top cowling 228. In this way, the "splitless" top cowling 228 improves a downstream flow of air that may contact or impinge another component of an associated aircraft, e.g., the underside of a wing. Therefore, the lack of splits in the top cowling 228 can advantageously reduce drag on, and improve fuel efficiency of, the associated aircraft. As shown in FIG. 2D, in some embodiments the nacelle 216 can include a longitudinally extending split 290 extending from the inlet lip 224 to the outlet 231 along the bottom side of the nacelle 216. In this way, the inlet cowling 226 and/or outlet cowling 230 can include complementary halves that may rotate about the longitudinal axis 277 of the nacelle 216 to provide access to internal components within the nacelle 216.

In some embodiments, the nacelle 216 can include a variable area fan nozzle cowling configured to adjust a size of the outlet 231 of the nacelle. In such embodiments, it can be desirable to limit the span of the variable area fan nozzle such that it does not overlap with the span of the top cowling 228 to avoid an interface or split therebetween.

As shown in FIGS. 2B and 2C, the top cowling 228 can be structurally integrated with the pylon 218 such that the inlet and/or outlet cowlings 226, 230 can translate or otherwise move relative to the top cowling 228 and pylon 218. In some embodiments, the top cowling 228 and the pylon 218 are integrally formed such that there are no splits formed therebetween. For example, the top cowling 228 and the pylon 218 may be formed from a single homogeneous piece of material. In other embodiments, the top cowling 228 and the pylon may be separate structures that are permanently affixed to one another. For example, the top cowling 228 and the pylon 218 may be inseparable without damaging at least one of the top cowling 228 and the pylon 218. In such embodiments, one or more fairings or other aerodynamic structures may be incorporated between the top cowling 228 and the pylon 218 to improve the aerodynamic characteristics of the top cowling and pylon.

As shown in FIG. 2E, the nacelle 216 can include blocker doors 284 that are activated to impede (e.g., to prevent, inhibit, or reduce) the flow of air that bypasses the engine 215 and prevents such air from passing through the outlet 231 of the nacelle 216 when the nacelle 216 is in a reverse thrust configuration. The nacelle 216 also includes upper blocker doors 286 that are independently controllable from the other blocker doors 284 to allow for air flow to pass through outlet 231 of the nacelle near the top cowling 228 in order to balance duct pressures within the nacelle.

FIGS. 3A-3E illustrate another embodiment of a nacelle 316. In contrast to the nacelle of FIGS. 2A-2E, the inlet lip 324 of nacelle 316 extends below at least a portion of the top cowling 328 to the outlet cowling 330. In this way, the inlet lip 324 of nacelle 316 forms an inlet cowling as well as an inlet lip that defines the inlet 319 of the nacelle. As a result of the extension of the inlet lip 324 extending below a portion of the top cowling 328 to the outlet cowling 330, the nacelle 316 includes one less transverse split than the nacelle 216 of FIGS. 2A-2E. Thus, the nacelle 316 includes transverse splits 342a, 342b disposed between the inlet lip 324 and the outlet cowling 330, a longitudinally extending split 390 extending from the transverse splits 342a, 342b to the outlet 331, and a pair of longitudinally extending splits 340a, 340b disposed between the top cowling 328 and the inlet lip 324 and outlet cowling 330. As with the nacelle of FIGS. 2A-2E, the top cowling 328 does not include any transverse-extending splits or junctures between the inlet lip 324 and the outlet 331 of the nacelle 316. Thus, a flow of air passing over the outer surface of the top cowling 328 of the nacelle 316 is less likely to form perturbations and/or disturbances stemming from splits in the top cowling 328.

FIGS. 4A-4D illustrate another embodiment of a nacelle 416. FIG. 4A schematically depicts a front view of the nacelle 416 and an engine 415 housed therein. The nacelle 416 includes an inlet lip 424 which defines an inlet 419. In contrast to the inlet lips of FIGS. 2A-3E, inlet lip 424 is formed by an inlet cowling 426 and a top cowling 428. In some embodiments, the inlet cowling 426 defines a C-shaped portion of the inlet lip 424 and the remainder of the inlet lip is defined by the top cowling 428. For example, the top cowling 428 can span between 10° and 180° of the circumference of the nacelle 416, or more, of the inlet lip 424 and the inlet cowling 426 can span the remaining portion of the inlet lip 424. In some embodiments, the top cowling 428 spans between about 20° and about 90° of the inlet lip 424 and the inlet cowling 426 spans the remaining portion of the inlet lip 424.

FIGS. 4B and 4C illustrate a side view and a top view, respectively, of the nacelle 416. As can be seen in these figures, the nacelle 416 includes an outlet cowling 430 disposed adjacent to the inlet cowling 426. Transverse splits 442a, 442b are disposed between the inlet cowling 426 and the outlet cowling 430. Additionally, the nacelle 416 includes a pair of longitudinally extending splits 440a, 440b disposed between the top cowling 428 and the inlet and outlet cowlings 426, 430. As discussed above, such splits 440a, 440b, 442a, 442b can introduce perturbations to a flow of air that passes over the nacelle 416 and the resulting perturbations can flow downstream. However, as shown in FIGS. 4B and 4C, in contrast to the nacelles of FIGS. 2A-3E, the top of the nacelle 416 does not include any transverse-extending splits or junctures between the inlet 419 and the outlet 431. As shown in FIG. 4D, in some embodiments the nacelle 416 can include a longitudinally extending split 490 extending from the inlet 419 to the outlet 431 along the bottom side of the nacelle 416. In other embodiments, the split 490 may extend only aft of the inlet cowling 426 along the outlet cowling 430 to the outlet 431. In some embodiments, the inlet 419 and/or the inlet cowling 426 may or may not be split by the longitudinally extending split 490, depending on enhanced service access features. In any case, the presences of the longitudinally extending split 490 along the bottom of the nacelle 416 does not impact the aerodynamic benefits provided by the splitless top cowling 428. Although this split 490 may introduce perturbations to a flow of air that passes over the underside of the nacelle 416, such perturbations are unlikely to increase drag forces on downstream surfaces of the aircraft because the split 490 is disposed on the underside of the nacelle 416 (e.g., away from an associated wing).

Figure 5:
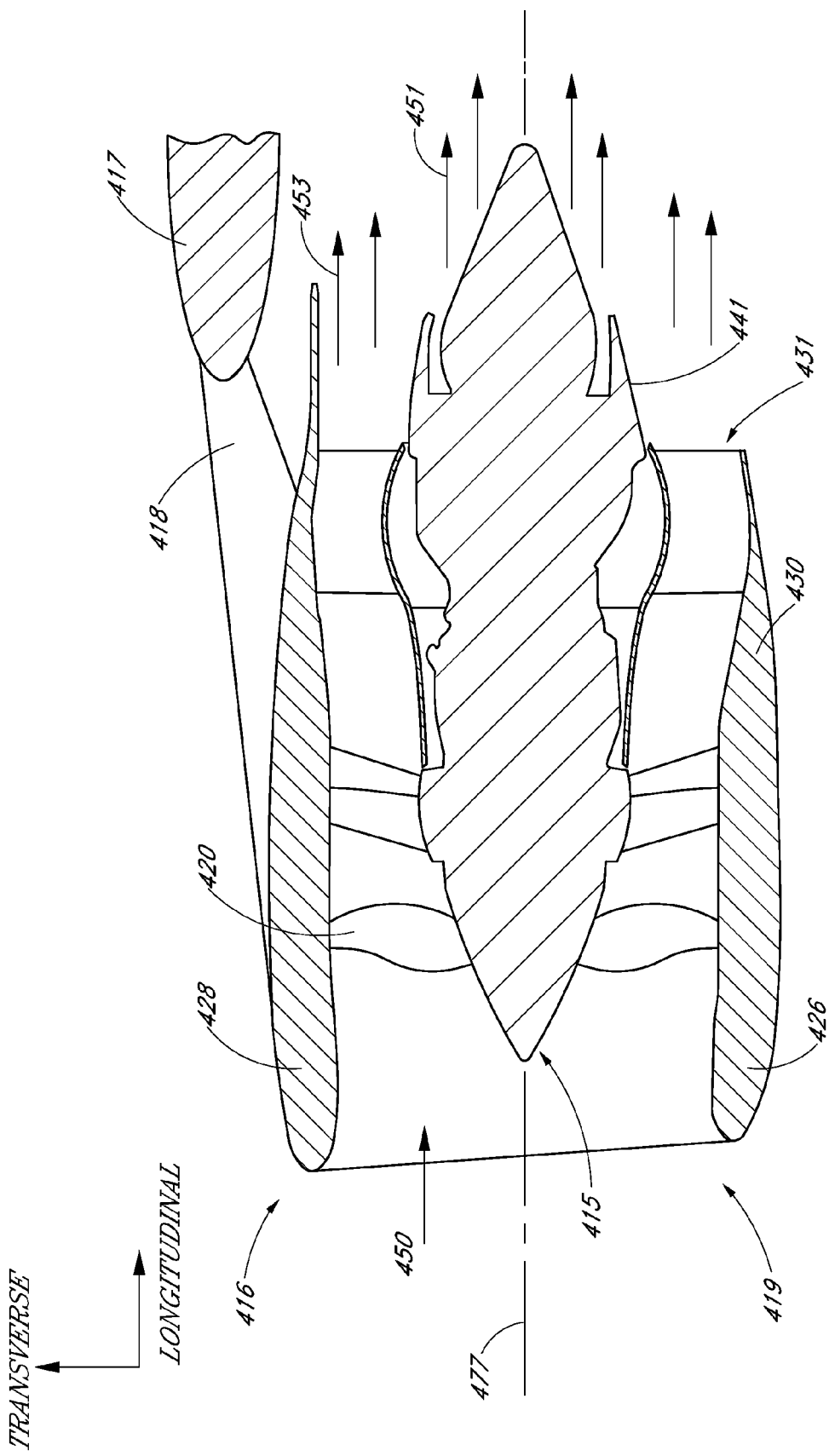
FIG. 5 is a cross-sectional view through the nacelle of FIG. 4C along line 5-5.

FIG. 5 shows a cross-sectional view of the nacelle 416 and engine 415 taken along line 5-5 of FIG. 4C. As shown, the engine 415 extends along a centerline 477 disposed parallel to the longitudinal axis of the nacelle 416. The engine 415 includes an exhaust nozzle 441 that extends through the outlet 431 of the nacelle 416.

Figure 6A:
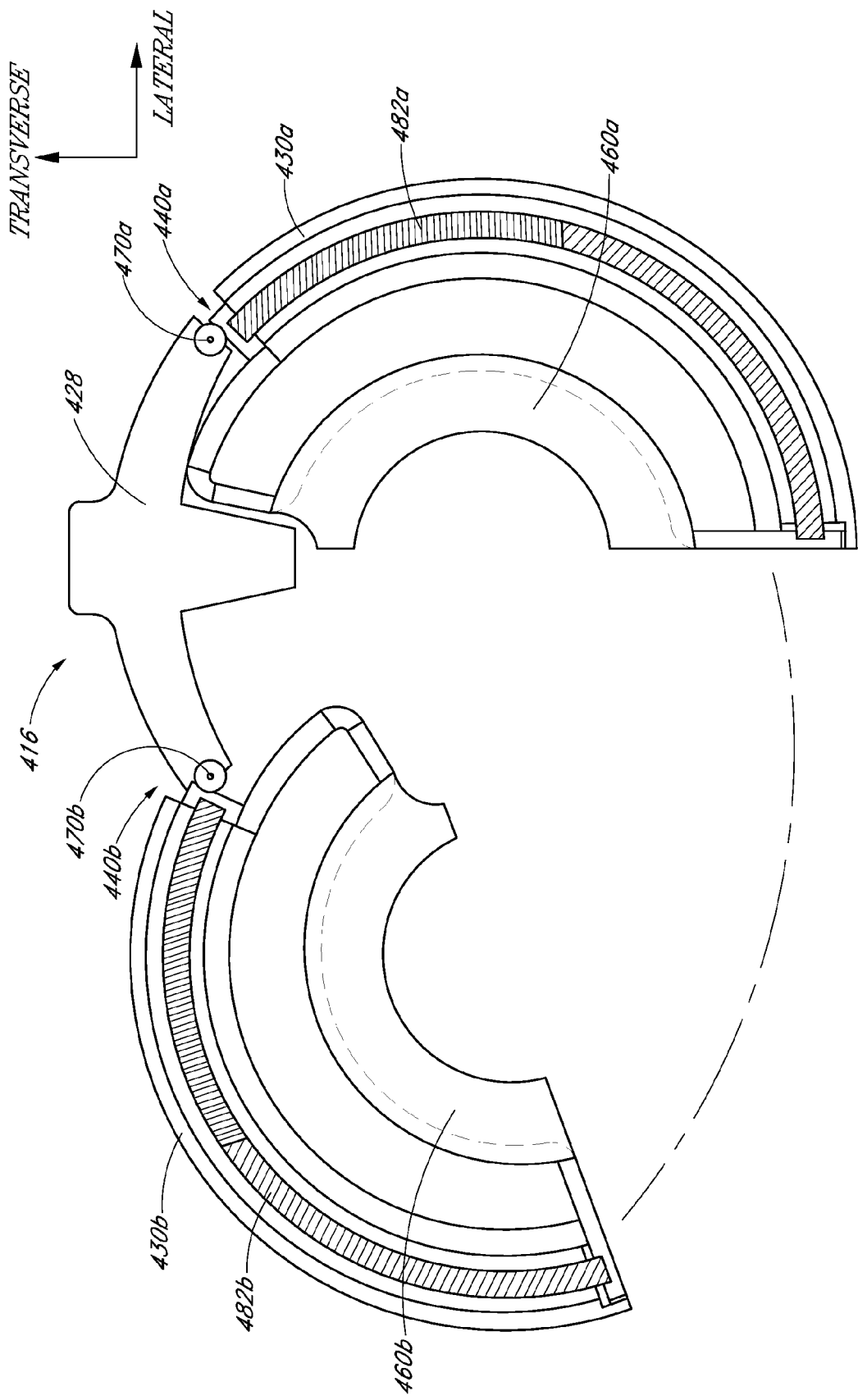
FIG. 6A is a cross-sectional view of the nacelle of FIG. 4C taken along line 6-6 with the nacelle in an open position, according to one embodiment.
Figure 6B:
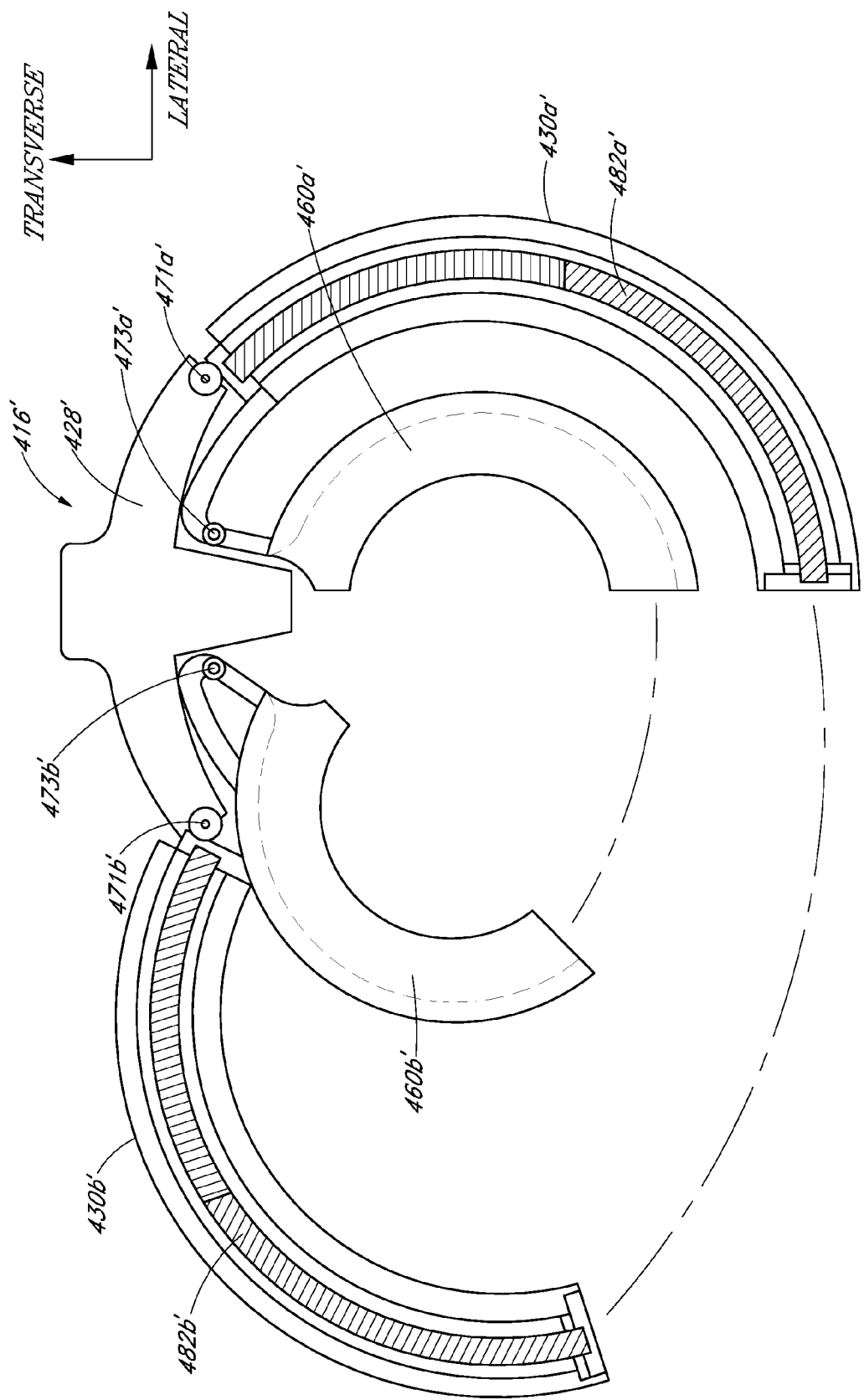
FIG. 6B is a cross-sectional view of the nacelle of FIG. 4C taken along line 6-6 with the nacelle in an open position, according to another embodiment.

FIGS. 6A and 6B show cross-sectional views of the nacelle 416 and engine cowling 460 taken along line 6-6 of FIG. 4C according to alternative embodiments. FIG. 6A shows an embodiment of the nacelle 416 wherein the outlet cowling is divided into halves 430a, 430b that are each rotatable relative to the longitudinal axis of the nacelle 416 about hinges 470a, 470b disposed near the longitudinal splits 440a, 440b. The outlet cowling halves 430a, 430b are coupled with halves 460a, 460b of the engine cowling 460 such that the engine cowling halves 460a, 460b rotate along with their respective outlet cowling halves 430a, 430b. In this way, one outlet cowling half 430a can be rotated relative to the top cowling 428 together with an associated engine cowling half 460a to provide access to internal components and/or compartments of the engine.

FIG. 6B shows an alternative embodiment of a nacelle 416' wherein the outlet cowling halves 430a', 430b' are separately rotatable from their respective engine cowling halves 460a', 460b' about hinges 471a', 471b'. As shown, the engine cowling halves 460a', 460b' are configured to rotate about hinges 473a', 473b'. Hinges 473a', 473b' are separate from the hinges 471a', 471b'. In this way, greater access is provided to internal components and/or compartments of the engine than the configuration illustrated in FIG. 6A.

As schematically illustrated in FIG. 5, the fan 420 acts to draw incoming air 450 into the nacelle 416 through the inlet 419. A portion of the incoming air 450 may be diverted into the engine 415 and utilized for combustion while another portion 453 of the drawn in air 450 may bypass the engine 415 and pass over the engine cowling 460. Thus, bypass air 453 may exit the outlet 431 along with a flow of engine exhaust 451 to provide a forward thrust relative to the nacelle 416 (e.g., to provide a force that thrusts the nacelle and its associated aircraft from right to left as illustrated in FIG. 5).

Figure 7:
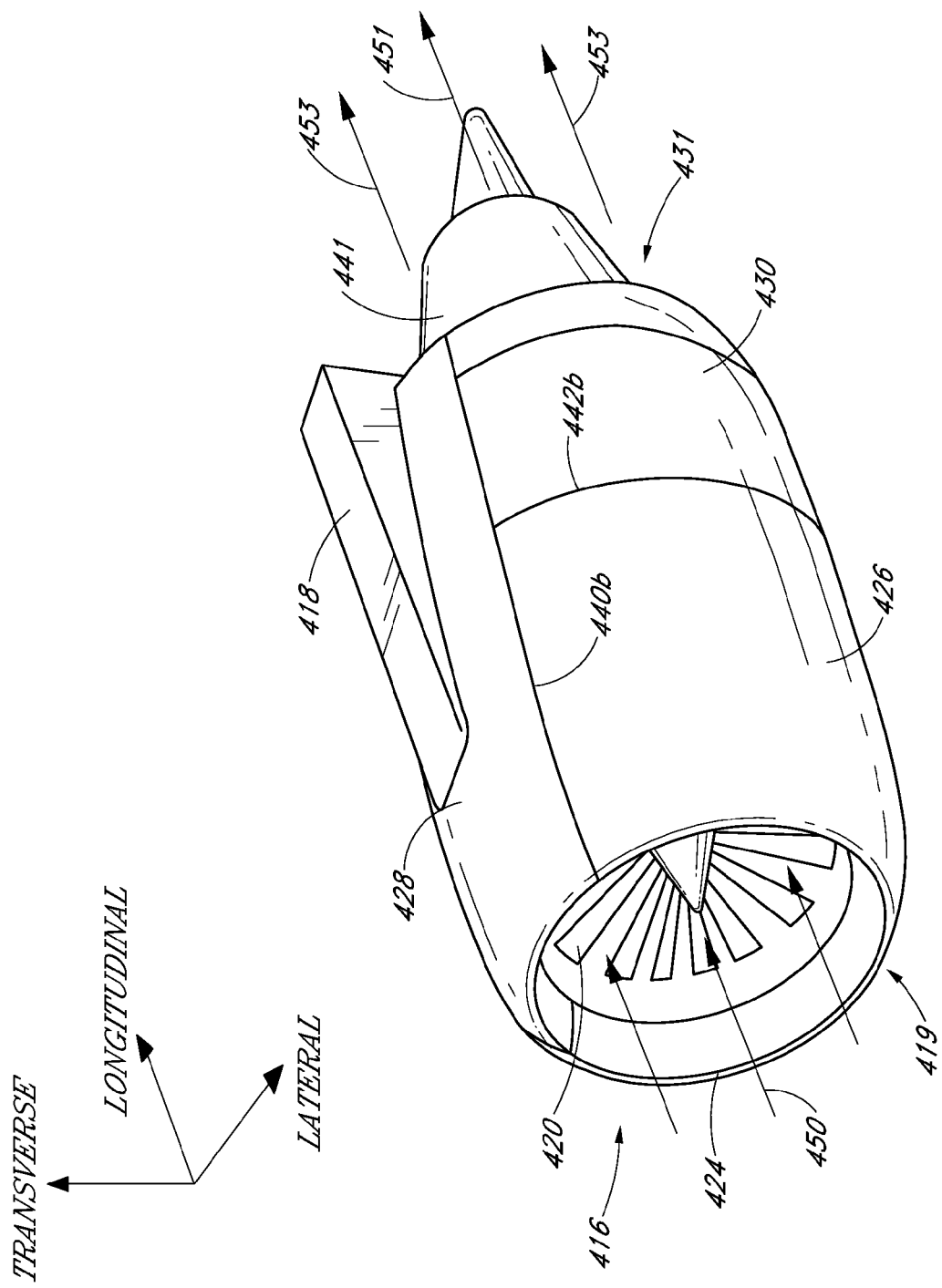
FIG. 7 is a perspective view of the nacelle of FIGS. 2A-2E in a forward thrust configuration.
Figure 8:
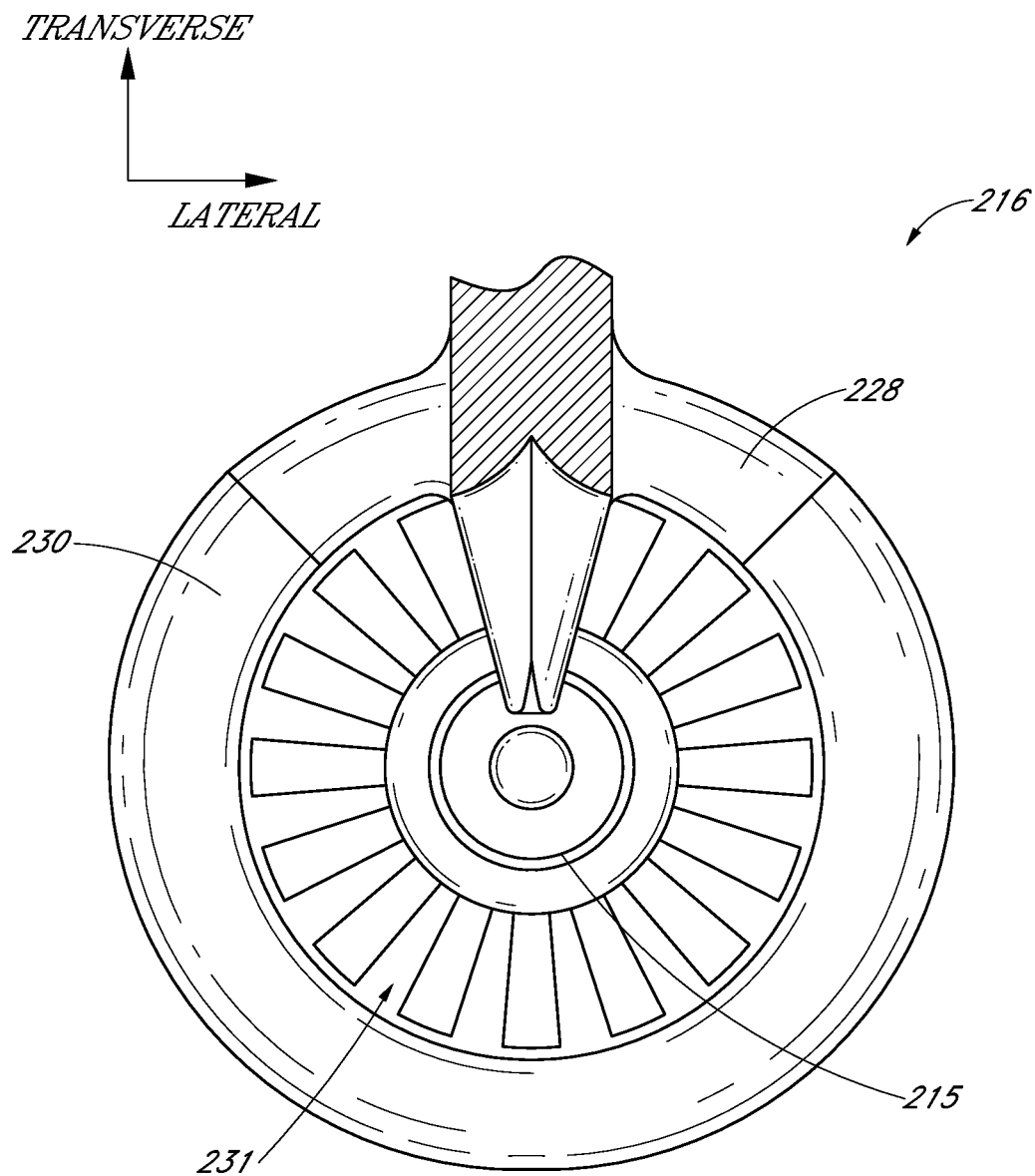
FIG. 8 is a rear view of the nacelle of FIG. 7 in the forward thrust configuration.

FIG. 7 is a perspective view of the nacelle 416 and engine 415 of FIGS. 4A-4D in a forward thrust configuration. As shown in FIG. 7, when in the forward thrust configuration, the outlet 431 of the nacelle 416 is substantially unimpeded by blocker doors such that the engine exhaust 451 and bypass air 453 may freely exit the nacelle 416 through an air pathway or duct defined between the inlet 419 and outlet 431 of the nacelle.

Figure 9:
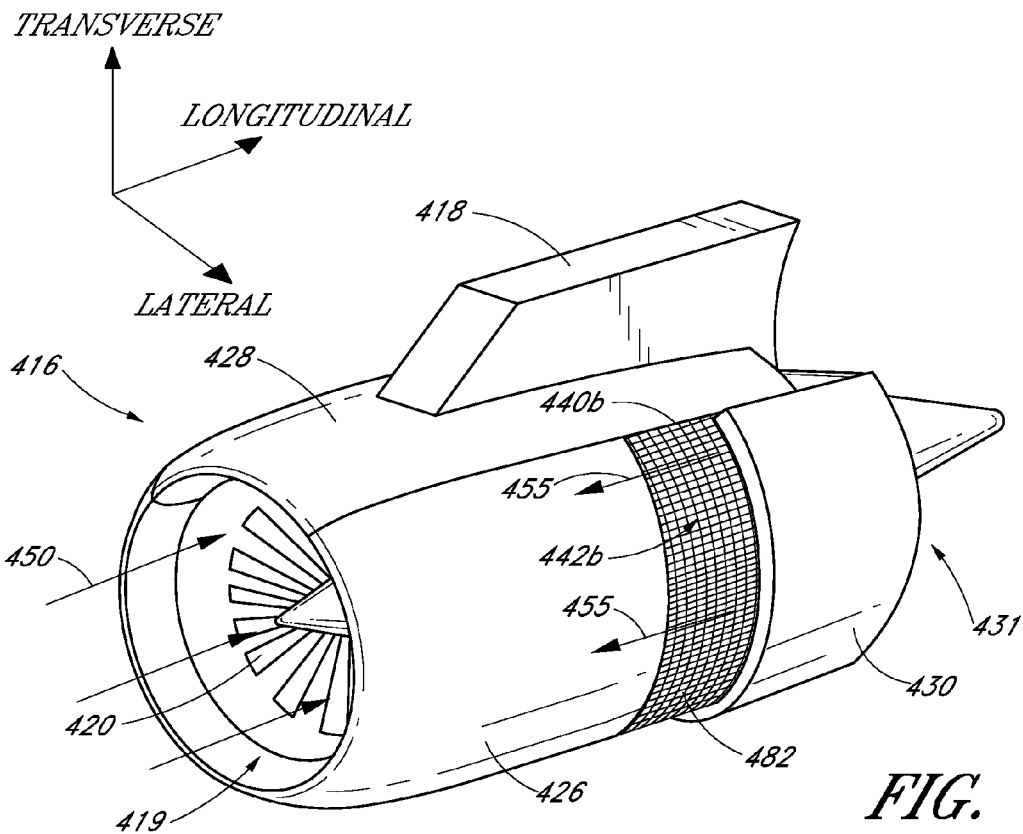
FIG. 9 is a perspective view of the nacelle of FIGS. 4A-4D in a reverse thrust configuration.
Figure 10:
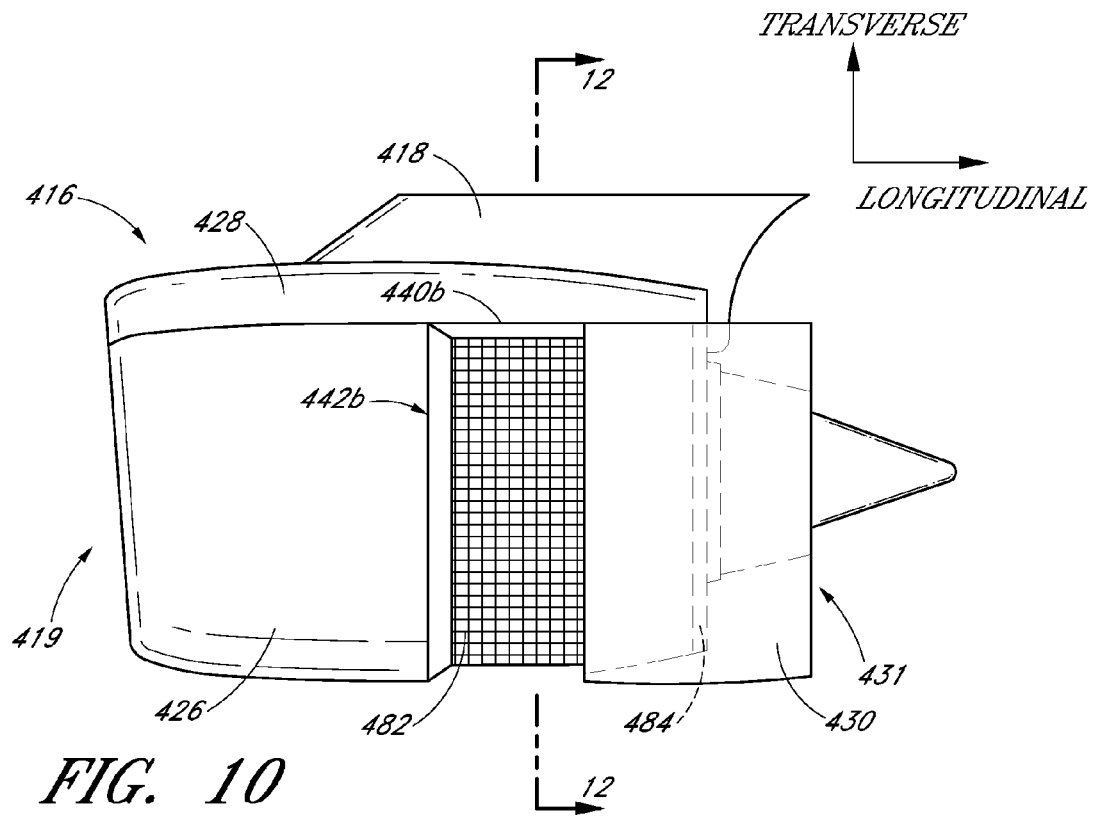
FIG. 10 is a side view of the nacelle of FIG. 9 in the reverse thrust configuration.

FIGS. 9 and 10 show the nacelle 416 of FIGS. 4A-4D in a reverse thrust configuration. In the reverse thrust configuration, the outlet cowling 430 is translated longitudinally away from the inlet cowling 426 as compared with the position of the outlet cowling illustrated above in FIGS. 4A-5 (e.g., as compared with the position of the outlet cowling in the forward thrust configuration). In some embodiments, the longitudinal translation of the outlet cowling 430 may be guided by the longitudinal splits 440b between the outlet cowling 430 and the top cowling 428. Such longitudinal translation of the outlet cowling 430 acts to expand the transverse splits 442a, 442b disposed between the inlet cowling 426 and the outlet cowling 430 and exposes an underlying cascade 482. The cascade 482 can include a plurality of vanes disposed circumferentially about the longitudinal axis of the nacelle 416. The vanes can redirect a flow of air from within the nacelle 416 through a lattice of the cascade such that the flow of air exits the nacelle and produces a reverse thrust.

In some embodiments, the cascade 482 is disposed between the outlet cowling 430 and the longitudinal axis of the nacelle 416 without extending between the top cowling 428 and the longitudinal axis. That is to say, the cascade 482 can be disposed radially inward of the outlet cowling 430 without being disposed radially inward of the top cowling 428. In other embodiments, the cascade 482 is disposed between the outlet cowling 430 and the longitudinal axis of the nacelle and is also at least partially disposed between the top cowling 428 and the longitudinal axis of the nacelle. As discussed below, in such embodiments, a reverse thrust will not pass through the portion of the cascade 482 disposed radially inward of the top cowling 428.

As shown in FIG. 11, as the outlet cowling 430 translates backwards, blocker doors 484 are activated to impede (e.g., to prevent, inhibit, or reduce) the flow of air that bypasses the engine 415 and prevents such air from passing through the outlet 431 of the nacelle 416. That is to say, the blocker doors 484 are activated to impede the flow of air through an air pathway defined between the inlet of the nacelle and the outlet 431. Instead of passing through the outlet 431, the majority of the bypass flow of air is diverted by the blocker doors 484 to pass through the cascade 482. The cascade 482, including a plurality of vanes and a lattice, acts to shape this flow of air such that a reverse thrust air flow 455 exits the cascade 482 toward the inlet cowling 426 as illustrated in FIG. 9. In the embodiment illustrated in FIGS. 9-11, the blocker doors 484 are configured to impede the flow of air that bypasses the engine 415 between the engine and the nacelle 416. As such, a person having ordinary skill in the art will appreciate that a reverse thrust may be improved by limiting the combustion of the engine 415 to reduce or eliminate the forward thrust provided by the exhaust 451 discussed above with reference to FIG. 5 when the nacelle 416 is in the reverse thrust configuration.

FIGS. 12A-12D illustrate cross-sectional views of the nacelle 416 taken along line 12-12 of FIG. 10 in accordance with various embodiments of the present invention. As can be seen in FIGS. 12A-12D, because the top cowling 428a, 428b, 428c, 428d extends continuously between the inlet 419 and outlet 431 of the nacelle 416 with no top side splits, the reverse thrust air flow 455a, 455b, 455c, 455d does not exit the nacelle 416 in the transverse direction toward the respective top cowling 428a, 428b, 428c, 428d. That is to say, the cascade 482 (see FIG. 10) does not extend in the region below the top cowling 428a, 428b, 428c, 428d and as such is not exposed when the nacelle is in the reverse thrust configuration because the top cowling extends continuously between the inlet 419 and the outlet 431.

Figure 12A:
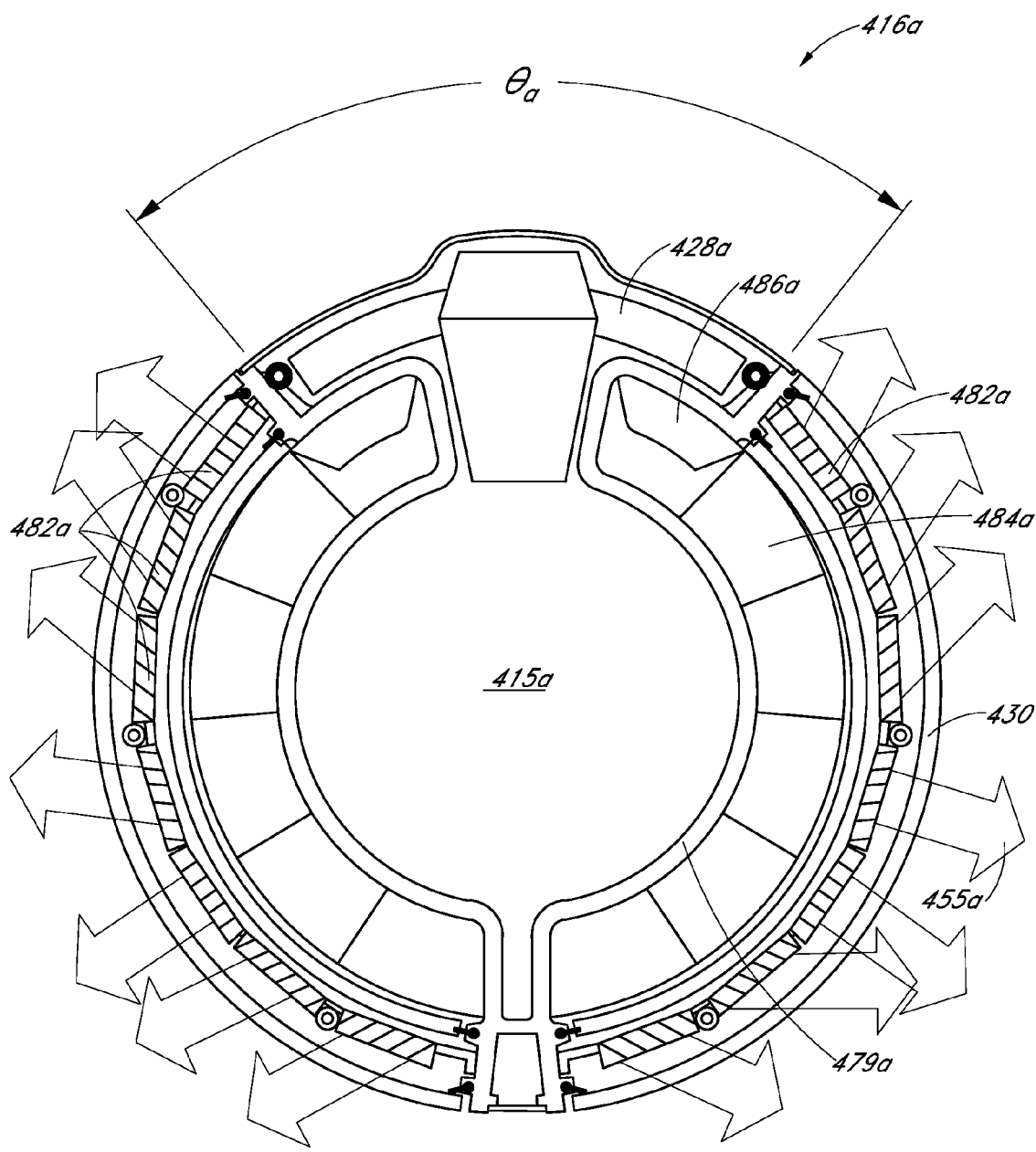
FIG. 12A is a cross-sectional view of the nacelle taken along line 12-12 in FIG. 10 according to one embodiment.
Figure 12B:
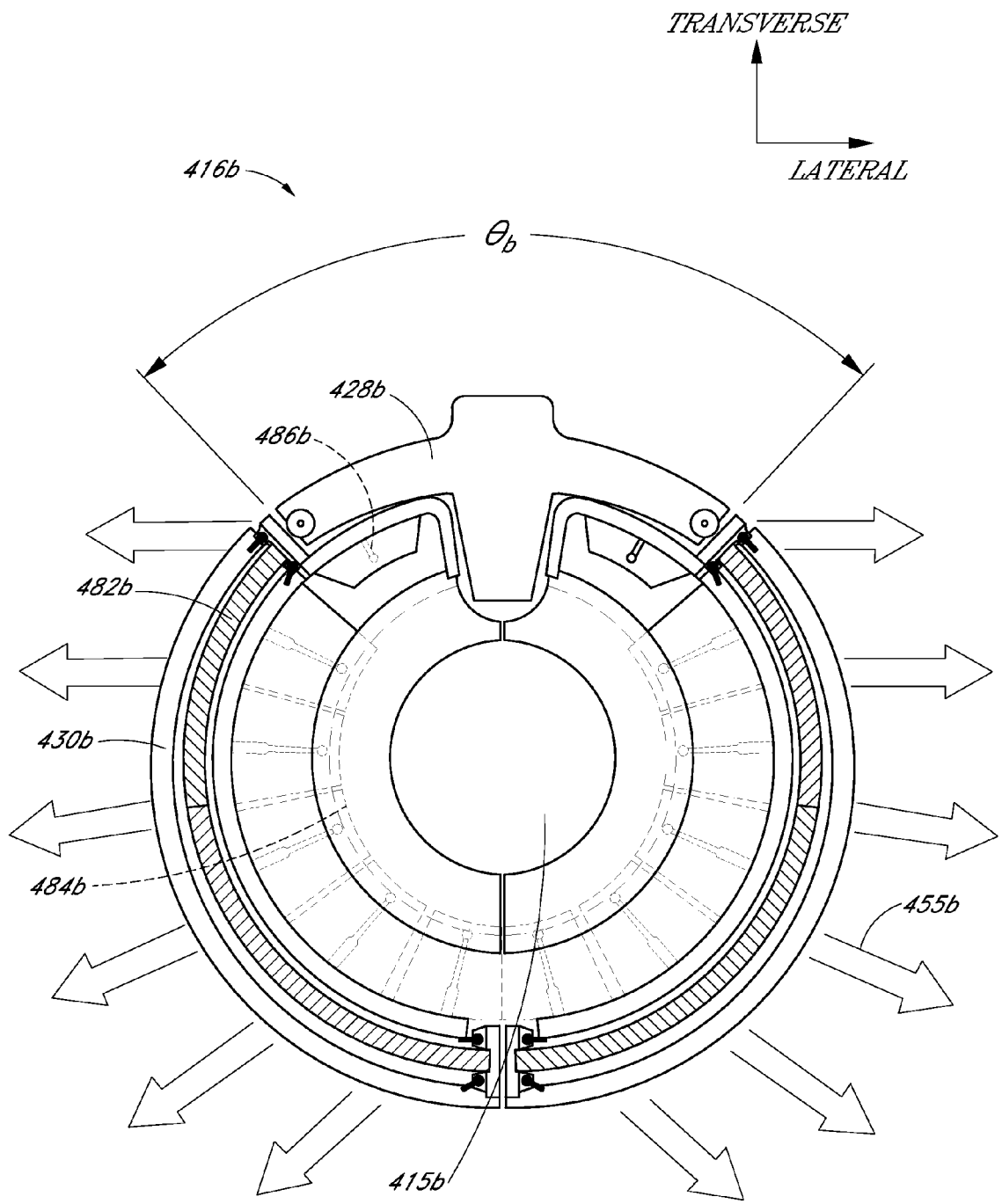
FIG. 12B is a cross-sectional view of the nacelle taken along line 12-12 in FIG. 10 according to another embodiment.
Figure 12C:
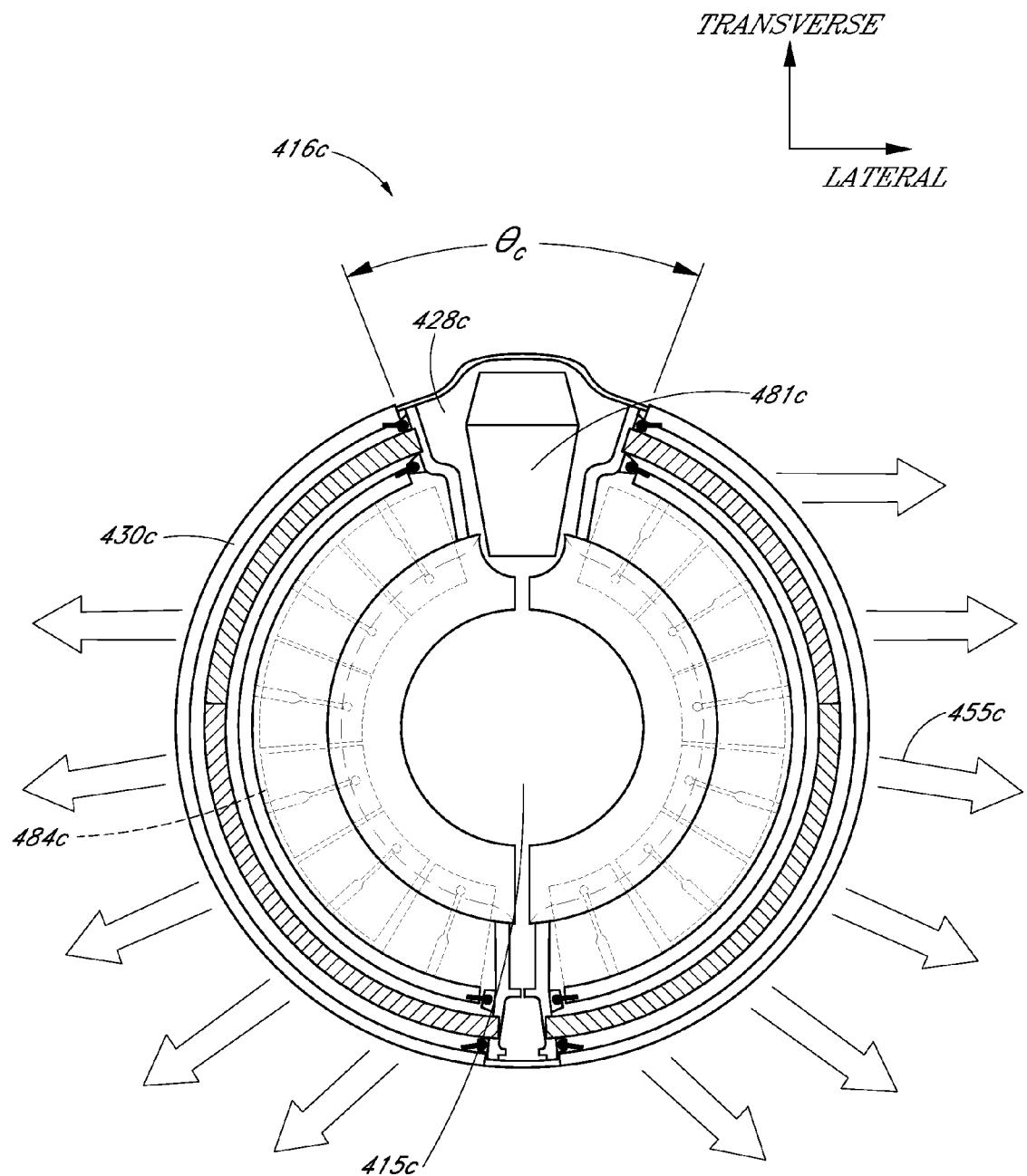
FIG. 12C is a cross-sectional view of the nacelle taken along line 12-12 in FIG. 10 according to another embodiment.
Figure 12D:
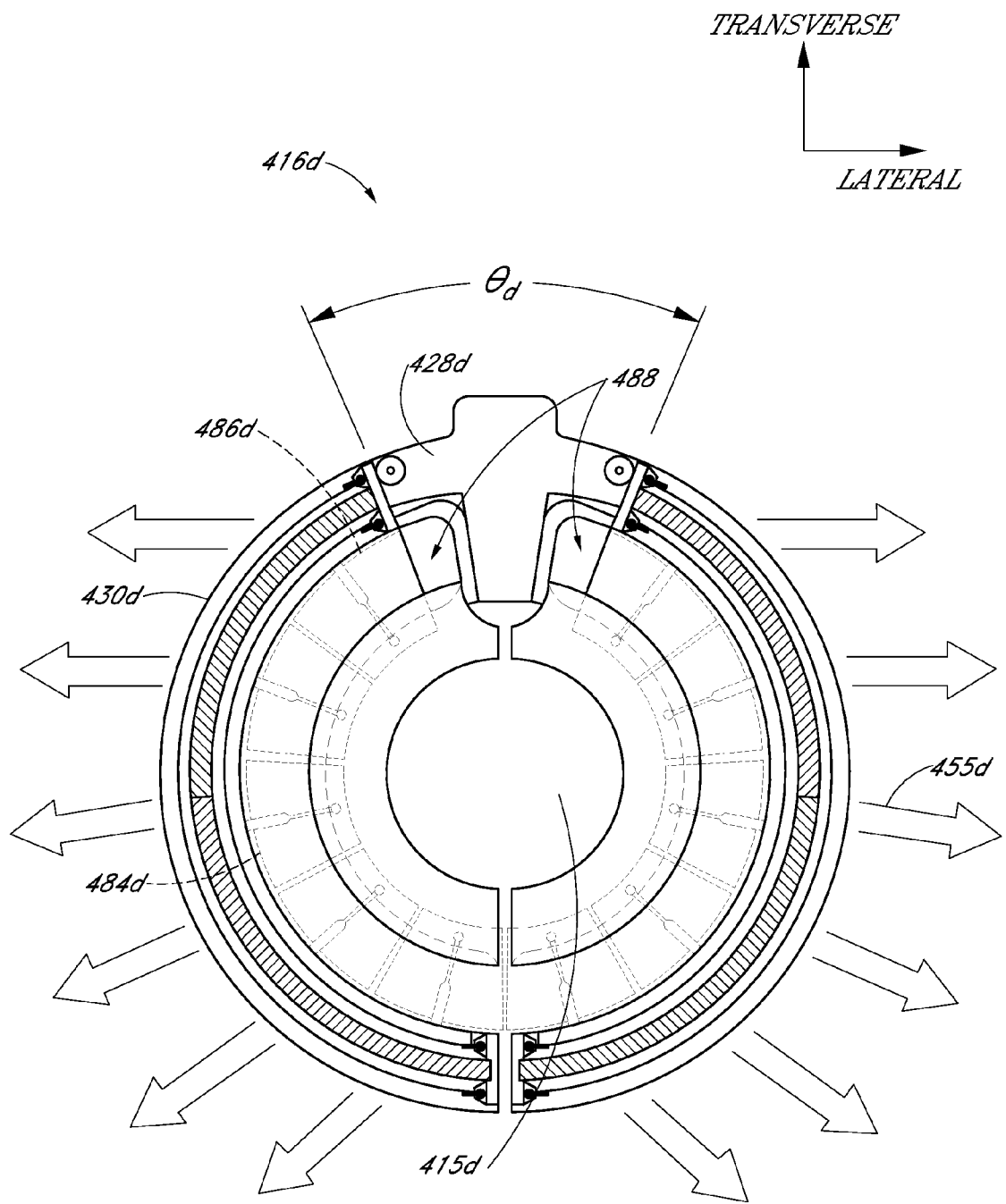
FIG. 12D is a cross-sectional view of the nacelle taken along line 12-12 in FIG. 10 according to another embodiment.

As shown by comparing FIGS. 12A-12D, the span of the top cowling 428a, 428b, 428c, 428d can vary between about 10° and 180° about the longitudinal axis of the nacelle 416. For example, as shown in FIG. 12A, the top cowling 428a can span an angle $\theta_a$ of about 90° about the longitudinal axis of the nacelle 416. As shown in FIG. 12C, the top cowling 428c can span an angle $\theta_c$ of about 20° about the longitudinal axis of the nacelle 416c. As shown in FIG. 12D, the top cowling 428d can span an angle $\theta_d$ of about 45° about the longitudinal axis of the nacelle 416d.

As shown in FIGS. 12A-12D, the area of the cascade 482 exposed for the reverse thrust air flow 455 can vary depending on the span of the top cowling 428a, 428b, 428c, 428d. For example, the exposed area of the cascade 482c depicted in FIG. 12C is greater than the exposed area of the cascade 482d depicted in FIG. 12D because the span of angle $\theta_c$ is less than the span of angle $\theta_d$. Accordingly, the resulting force of the reverse thrust can vary along with the exposed area of the cascade 482. That is to say, a larger area cascade 482 may provide for a greater reverse thrust than a smaller area cascade. However, as discussed above, because the top cowling 428 does not include any splits, the aerodynamic profile of the topside of the nacelle 416 is improved as compared with top cowlings having one or more transverse splits. Thus, a trade-off is recognized between increasing a span of the splitless top cowling 428 to improve the aerodynamic characteristics of the nacelle 416 and decreasing an effective area of the cascade 482 which can result in a reduction of reverse thrust strength. In some embodiments, the cascade 482 and the actuation strokes can be increased to offset at least some of the area loss.

As shown in FIG. 12A, the nacelle 416a can include a plurality of separate cascades 482a. By providing discrete or separate cascades 482a, the cascades 482a can be interchangeable and mounted specifically for individual aircraft requirements. For example, the separate cascades 482a can be mounted, oriented, positioned, or otherwise placed to direct the reverse thrust air flows 455a in different directions relative to the longitudinal axis of the nacelle 416a. In this way, the cascades 482a can be configured to control thrust reverse efflux flow so as to avoid impingement on structures of an associated aircraft (e.g., a wing).

Still referring to FIG. 12A, the nacelle 416a can include an inner fixed structure 479a disposed within the outlet cowling 430a. In some embodiments, the top two blocker doors 486a can be mounted on the inner fixed structure 479a. As such, the top two blocker doors 486a can be actuated independently from the other blocker doors 484a. For example, the blocker doors 486a may be deployed by means other than the translation of the outer cowling 430, e.g., by drag-linkless actuation systems. In the illustrated embodiment, because there are no cascades disposed below the top cowling 428a there is no flow of reverse thrust air flow 455a through the top cowling. As a result, the upper blocker doors 486a can be configured to allow leakage therethrough (e.g., through the outlet of the nacelle) to reduce asymmetric pressure loads on the fan disk.

Turning now to FIG. 12D, in some embodiments, a nacelle 416d need not include blocker doors that are independently actuated from the blocker doors 484d. For example, gaps 488 can be formed on opposite sides of the pylon fairing 481d between the pylon fairing and adjacent blocker doors 484d. The gaps 488 can be sized to allow for leakage therethrough in order to balance pressure loads on the fan disk during thrust reversing. As such, in some embodiments it may not be necessary to provide blocker doors for the gaps 488 and the gaps 488 may be permanently left open. However, in some embodiments, the nacelle may include independently actuated blocker doors that can be deployed from an inner fixed structure to optionally reduce leakage therethrough.

With reference to FIGS. 12A, 12B, and 12D, because the cascade 482 is not exposed along the top side of the nacelle 416, the nacelle may include upper blocker doors 486a, 486b, 486d that are independently controllable from the other blocker doors 484a, 484b, 484d to allow for air flow to pass through the outlet of the nacelle near the top cowling 428 in order to balance duct pressures within the nacelle.

Additionally, the blocker doors 484, 486 may be angled relative to the transverse axis of the nacelle 416 and/or angularly staggered relative to each other about the longitudinal axis of the nacelle. In this way, the blocker doors 484, 486 can allow a portion of bypass airflow that is not diverted through the cascade 482 (e.g., a portion of the bypass airflow that passes directly below the top cowling 428 and is not exposed to the cascade 482) to pass between the blocker doors 484, 486 such that the mass flow of air that bypasses the engine 415 through the inlet 419 is equal to the mass flow of air through the cascade 482 plus the mass flow of air through the outlet 431. As the flow of air between the blocker doors 484, 486 will be substantially in the longitudinal direction and will not be shaped by the nacelle 416 after passing through the blocker doors, such air will provide very little forward thrust to the nacelle without significantly reducing the effect of the reverse thrust provided through the cascade 482. Thus, the area of the cascade 482 and the area of the outlet 431 between the blocker doors 484, 486, the engine 415, and the nacelle 416 can match the area of the inlet to prevent damage to the engine that may be caused by drawing in more air than is combusted and/or expelled through the outlet 431 and cascade.

Figure 18:
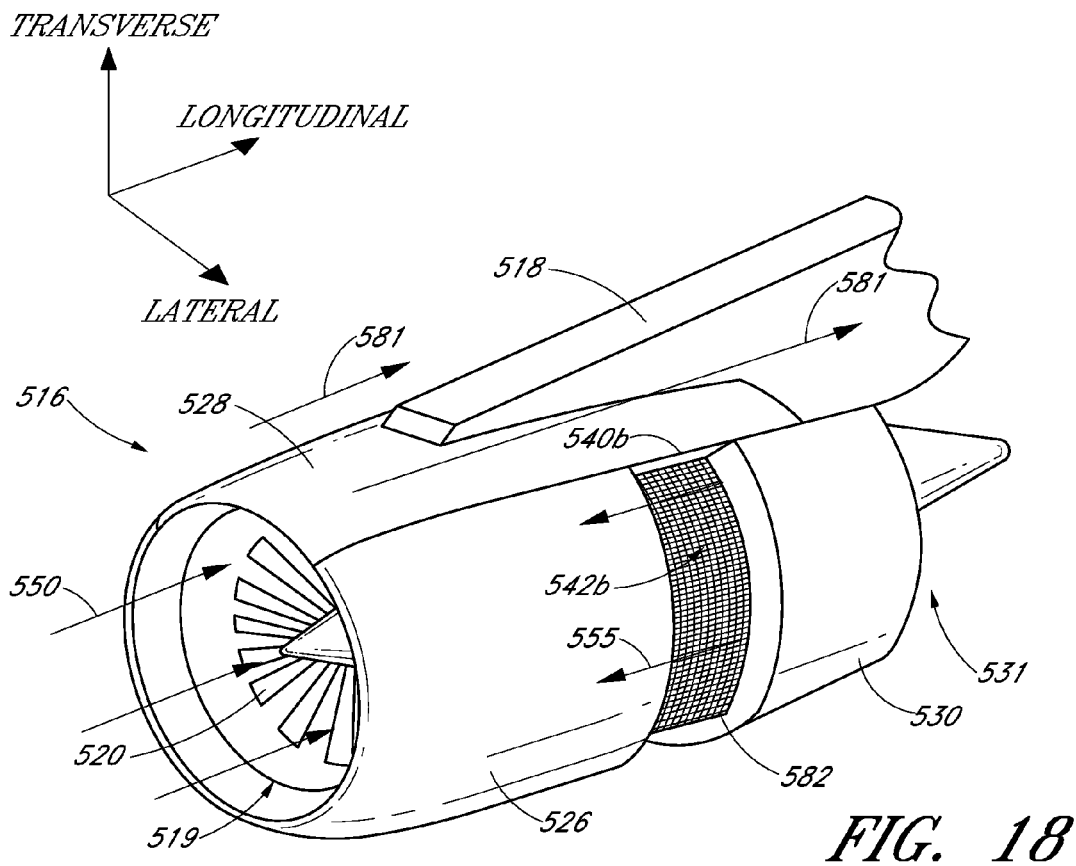
FIG. 18 is a perspective view of the nacelle and engine of FIG. 13 in a reverse thrust configuration.
Figure 19:
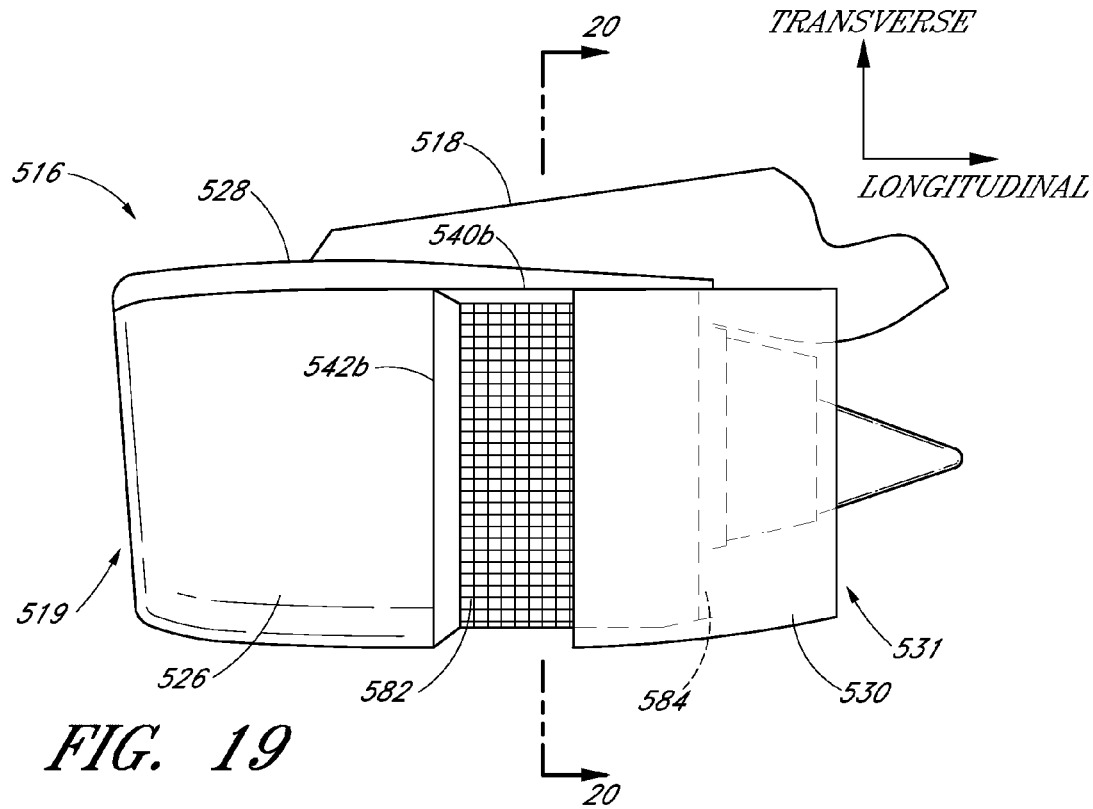
FIG. 19 is a side view of the nacelle and engine of FIG. 13 in the reverse thrust configuration.

FIGS. 13-21 illustrate an embodiment of a nacelle 516. The nacelle 516 houses an engine 515 extending along a centerline 577. As with the nacelle 416 discussed above, a fan 520 is disposed near the front-most side of the nacelle 516 to draw air into the nacelle through an inlet 519. The nacelle 516 includes an inlet lip 524 which defines the inlet 519 of the nacelle. The inlet lip 524 can be formed by a top cowling 528 and an inlet cowling 526. The nacelle 516 also includes an outlet cowling 530 which defines an outlet 531 along with the top cowling 528. As shown in FIGS. 18 and 19, the outlet cowling 530 can translate longitudinally relative to the inlet cowling 526 to expose a thrust reverser cascade 582 in a reverse thrust configuration.

Figure 13:
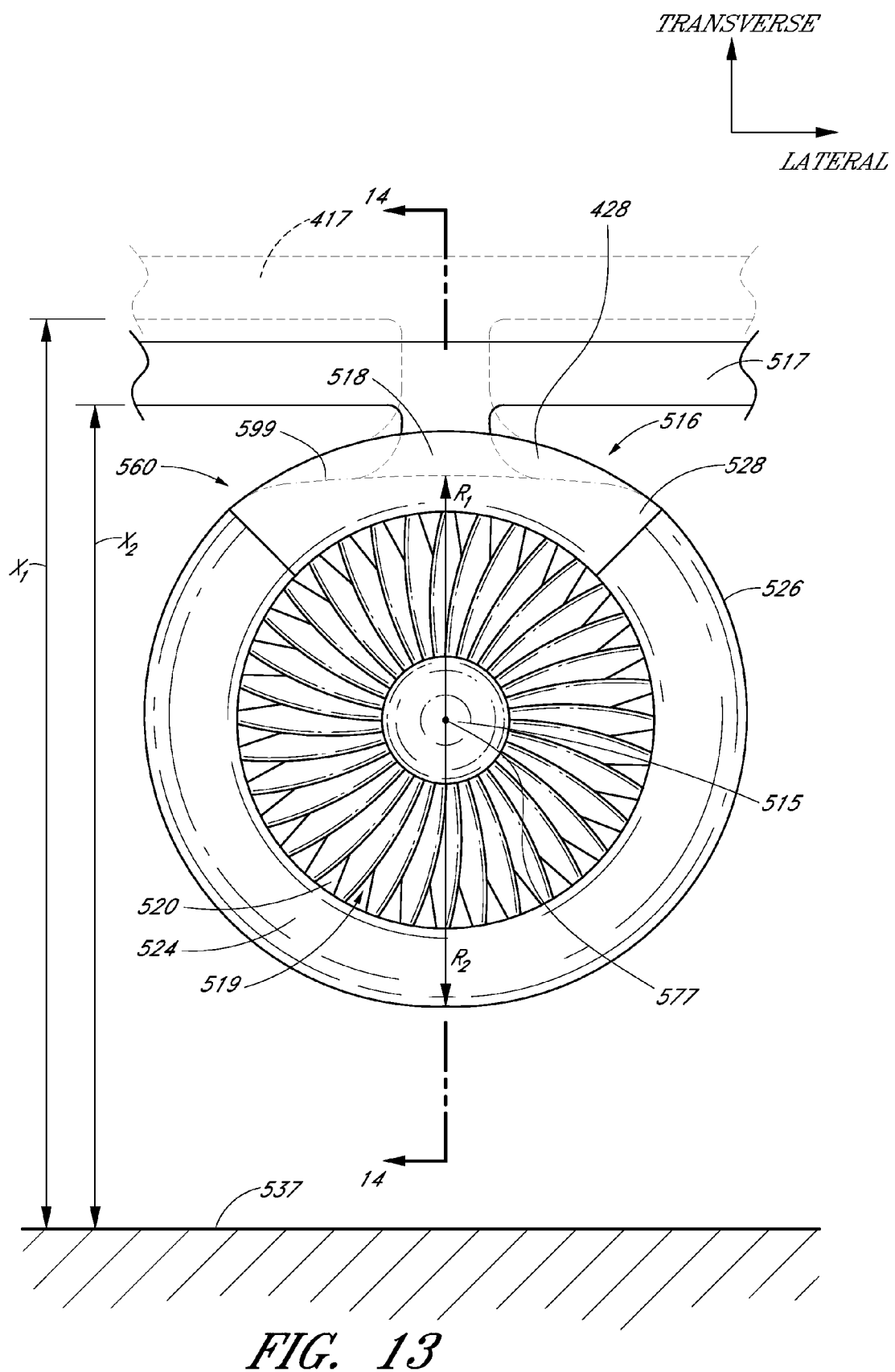
FIG. 13 is a front view of one embodiment of a nacelle having a contoured top cowling and an engine housed therein.

As illustrated in FIG. 13, the top cowling 528 includes a flattened surface 599 (shown in dashed lines) that is flattened or depressed relative to the inlet lip 524 portion of the top cowling 528. That is to say the flattened surface 599 in FIG. 13 has a maximum transverse dimension that is less than a maximum transverse dimension of the inlet lip 524. As a result of this configuration, the portion of the nacelle defined in part by the flattened surface 528 is not circular.

With continued reference to FIG. 13, because of the flattened surface 599, the top cowling 528 of nacelle 516 does not match the profile of the top cowling 428 of nacelle 416. For example, while the top cowling 428 of nacelle 416 is rounded from the inlet to the outlet, the flattened surface 599 can be disposed on a plane that extends parallel to a plane formed by the lateral and longitudinal axes of the nacelle 516. As illustrated, a transverse distance or radius $R_1$ between the centerline 577 of the engine 515 and the flattened surface 599 of the top cowling 528 is less than a transverse distance or radius $R_2$ between the centerline of the engine and a curved outer surface of the inlet cowling 526. The difference between the radiuses $R_1$ and $R_2$ can be equal to the dimensional differences in the maximum transverse dimensions of the inlet lip 524 and the flattened surface 599 portion of the top cowling 528.

Figure 14:
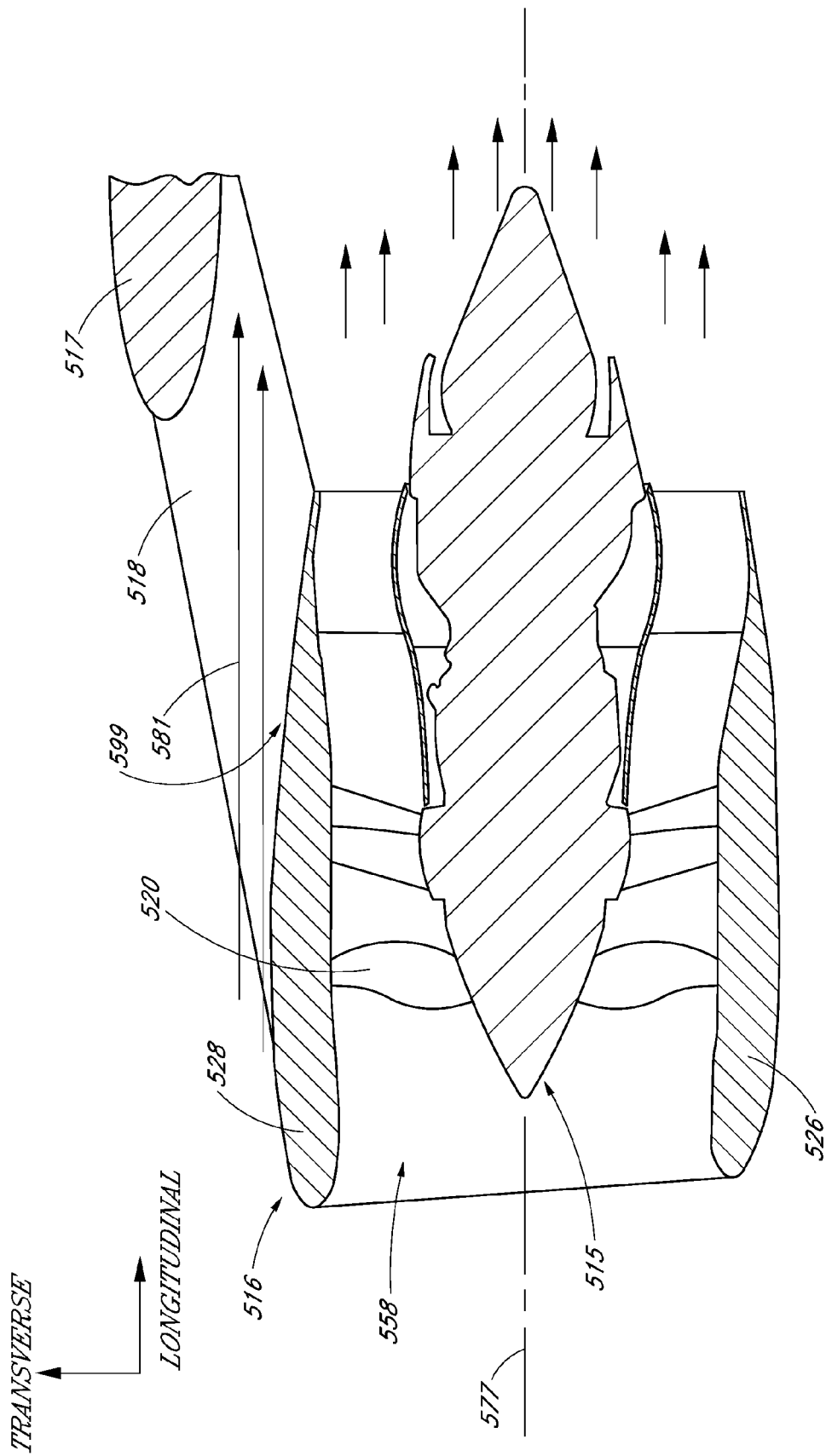
FIG. 14 is a cross-sectional view of the nacelle and engine of FIG. 13 taken along line 14-14.
Figure 15:
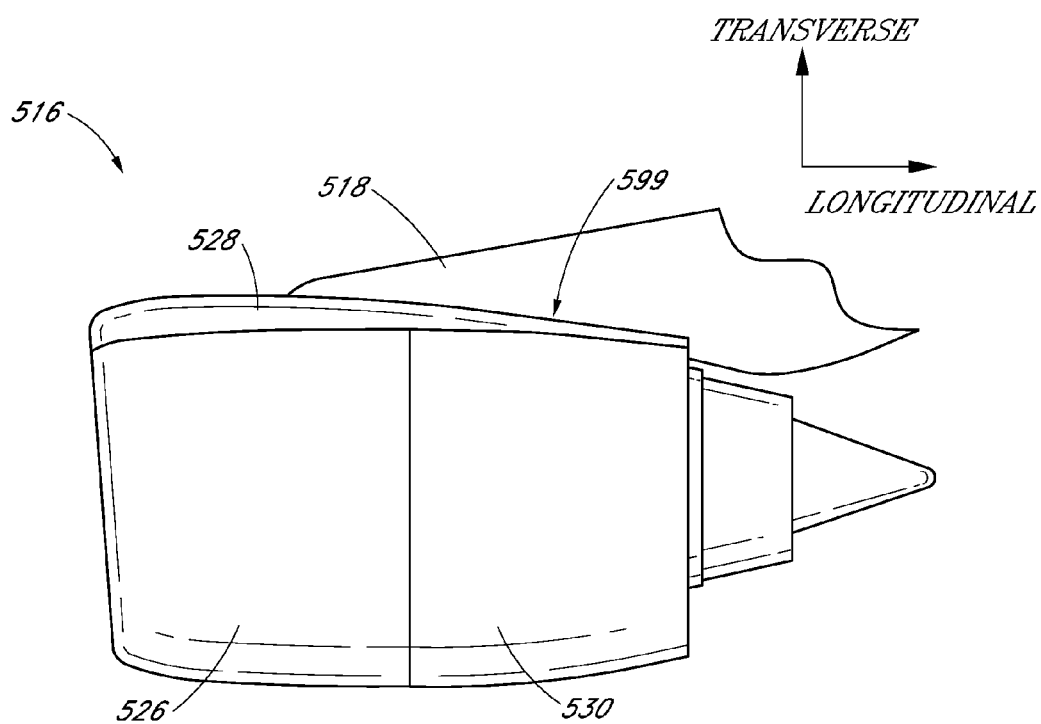
FIG. 15 is a side view of the nacelle of FIG. 13.
Figure 17:
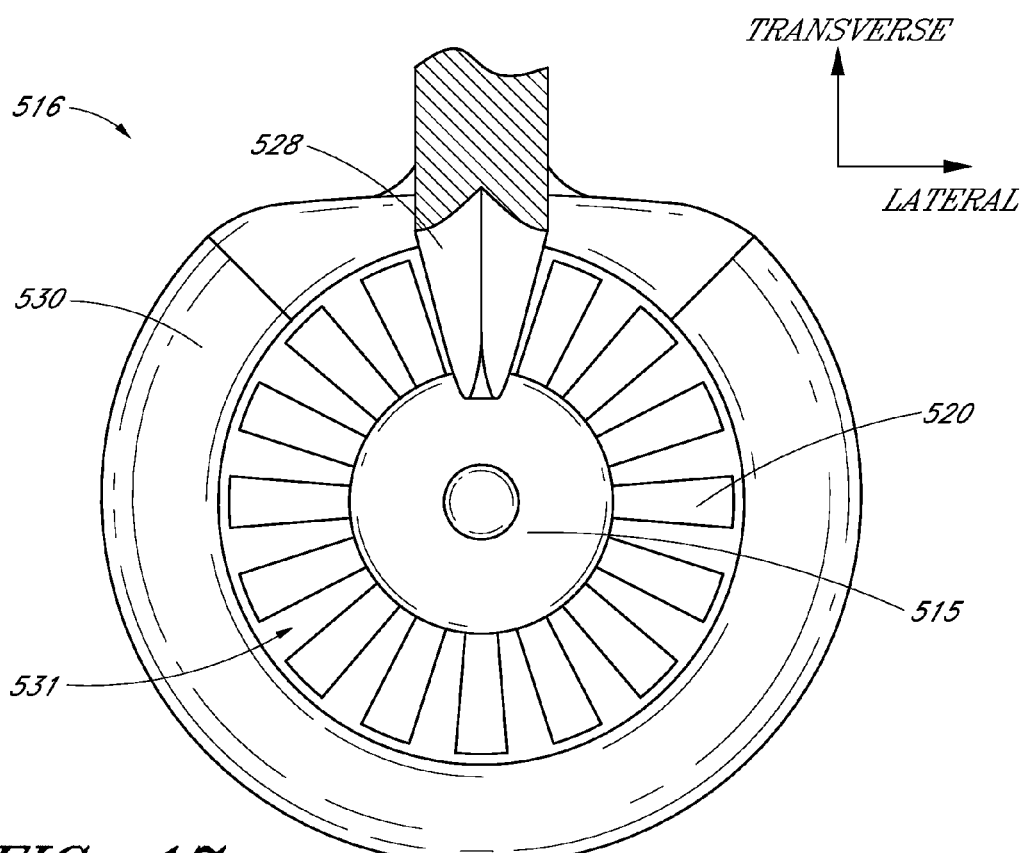
FIG. 17 is a rear view of the nacelle and engine of FIG. 16 in the forward thrust configuration.
Figure 16:
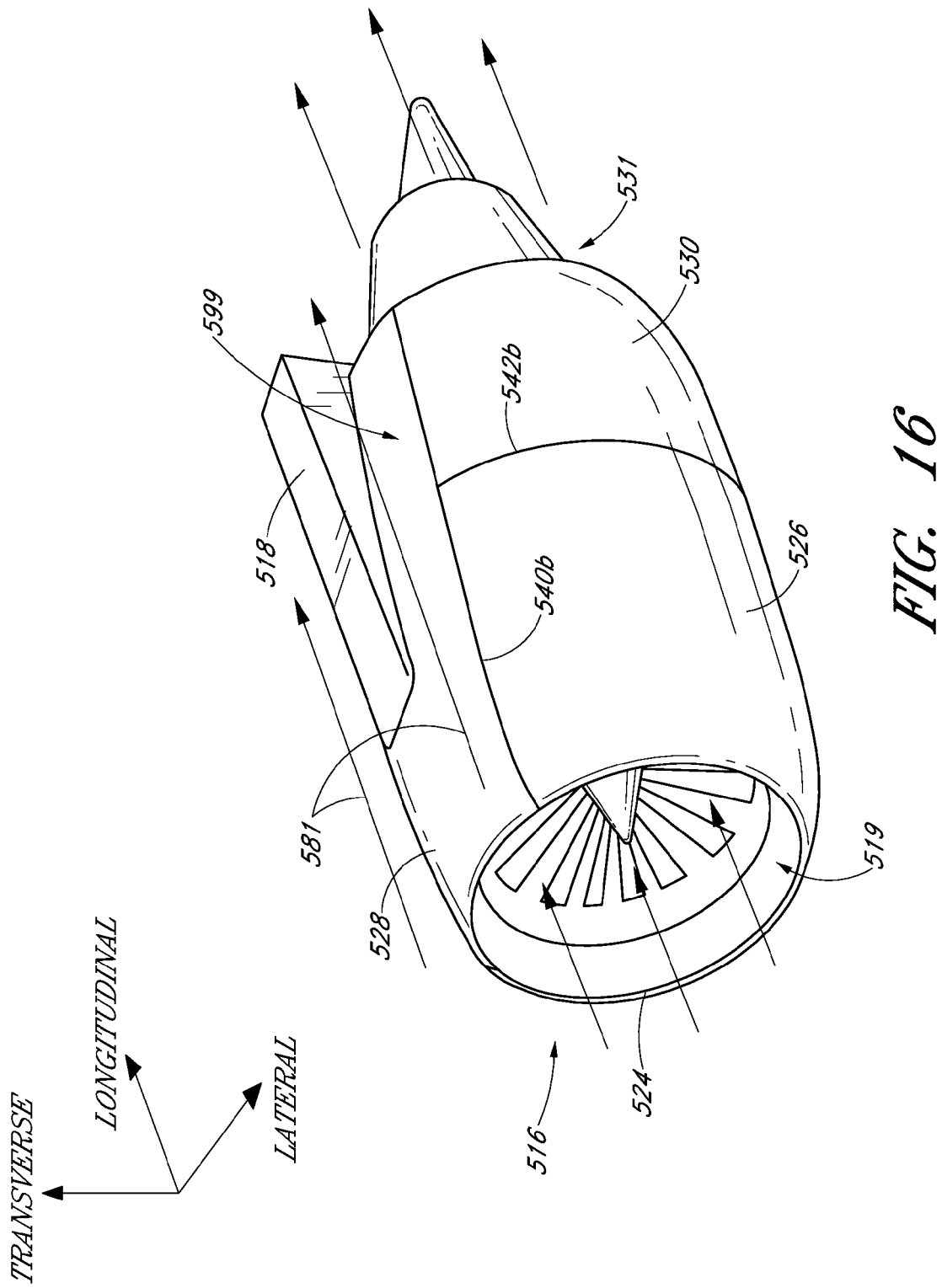
FIG. 16 is a perspective view of the nacelle and engine of FIG. 13 in a forward thrust configuration.

As shown in FIGS. 14 and 16, the flattened top cowling 528 can advantageously reduce drag on a down stream surface of a corresponding aircraft (e.g., wing 517) by allowing a flow of air 581 to pass through a clearance space formed between the top cowling 528 and the wing 517 without being redirected in a transverse direction by a curved shape of the top cowling. That is to say, the flattened surface 599 of the top cowling 528 allows for air to pass laminarly through the slipsteam clearance space on opposite sides of the pylon 518.

With reference to FIG. 14, the flattened surface 599 also provides an advantage over other nacelles in that the centerline 577 of the engine 515 can be raised relative to the underside of the wing 517 due to the lower profile of the flattened top cowling with respect to the wing. This feature allows for a larger engine and nacelle to be fitted within a given clearance dimension defined between a wing and a landing surface. Thus, an aircraft can be manufactured or retrofitted to incorporate a larger engine and nacelle without adjusting a clearance dimension between the aircraft's wings and the landing surface (e.g., without increasing the height of landing gear and/or modifying the air frame to raise the wings with respect to the fuselage).

As illustrated in FIG. 13, a clearance dimension $X_1$ is defined between the wing 417 and a landing surface 537 and a clearance dimension $X_2$ is defined between the wing 517 and the landing surface 537. Because the nacelle 516 can be disposed closer to the wing 517 due to the flattened top surface 599, $X_2$ can be less than $X_1$ while still maintaining a required clearance between the bottom of the nacelle 516 and the ground surface 537. An aircraft incorporating the nacelle illustrated in FIG. 13 can be manufactured with a lower amount of clearance while still incorporating an engine and nacelle of a certain required size. Similarly, an aircraft can be retrofitted with a larger engine and nacelle without requiring an increase in clearance X by forming the nacelle with a flattened top cowling.

Figure 20A:
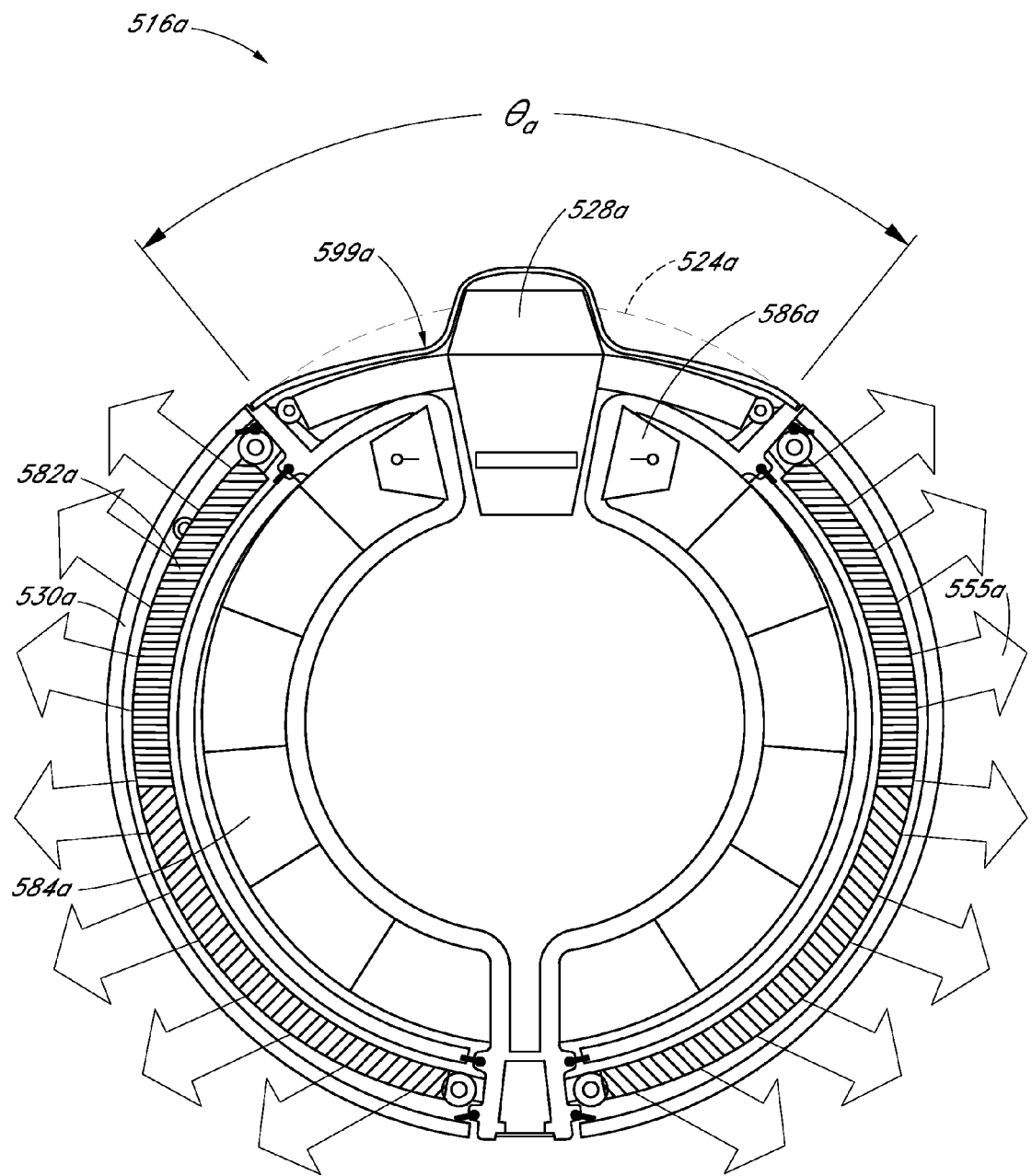
FIG. 20A is a cross-sectional view of the nacelle and engine of FIG. 19 taken along line 20-20 according to one embodiment.
Figure 20B:
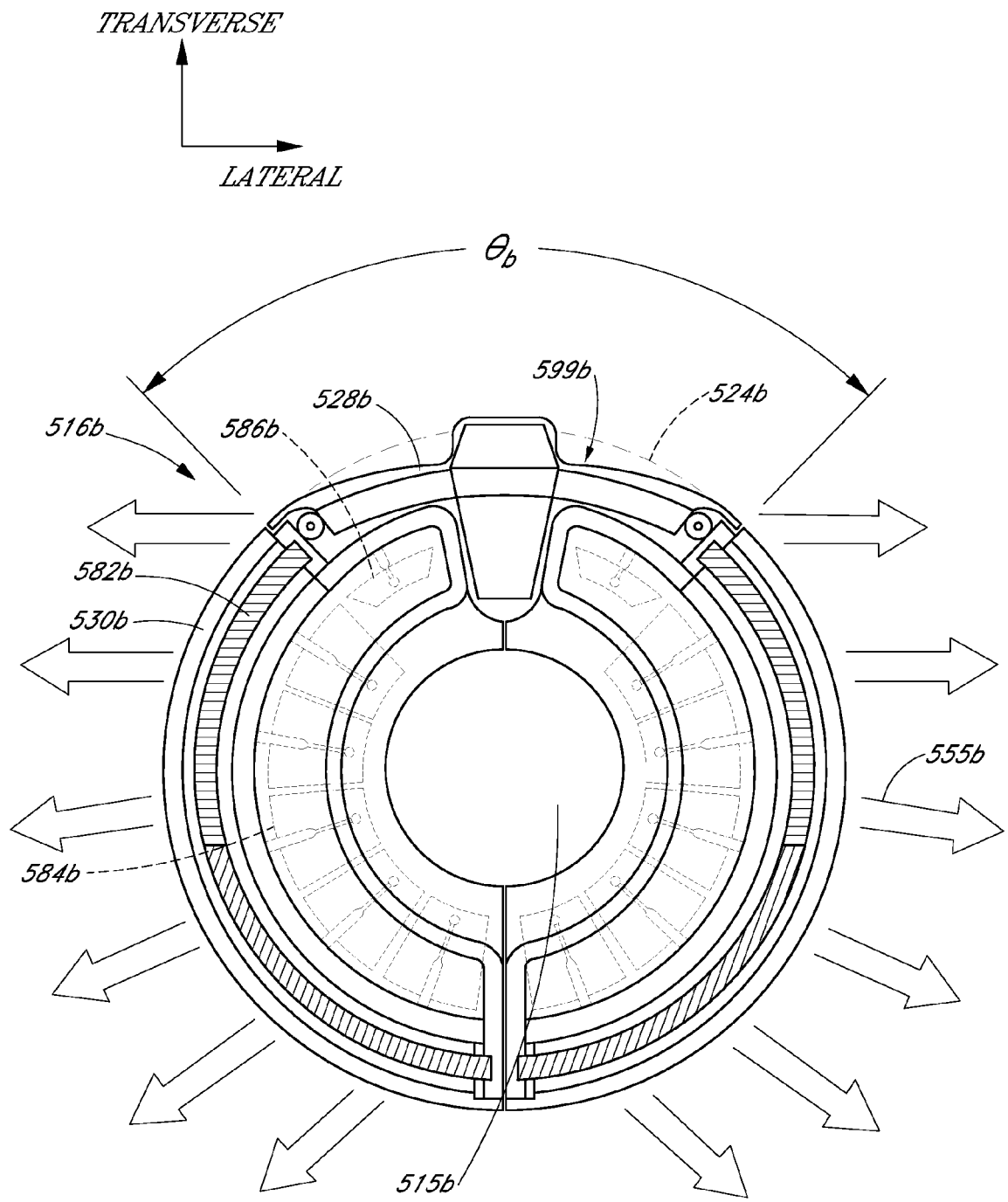
FIG. 20B is a cross-sectional view of the nacelle and engine of FIG. 19 taken along line 20-20 according to another embodiment.
Figure 20C:
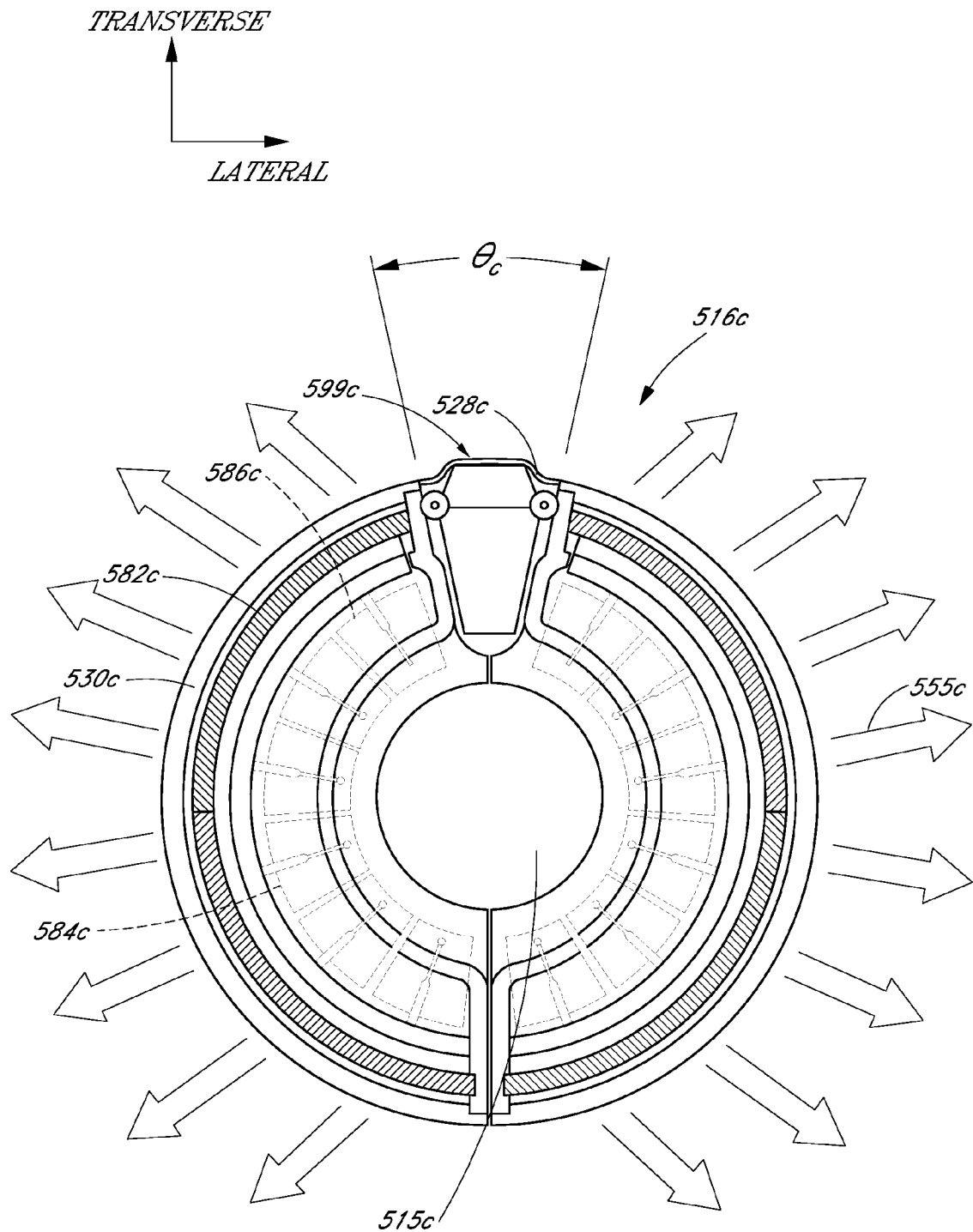
FIG. 20C is a cross-sectional view of the nacelle and engine of FIG. 19 taken along line 20-20 according to another embodiment.

As shown in FIGS. 18 and 19, the top cowling 528 can extend continuously between the inlet 519 and the outlet 531 of the nacelle 516 with no top side splits such that a reverse thrust of air 555 does not exit the nacelle 516 in the transverse direction toward the top cowling 528. Similar to FIGS. 12A-12D discussed above, as shown by comparing FIGS. 20A-20C, the angular span of the top cowling 528a, 528, 528c can vary between about 10° and about 180°, or more, about the longitudinal axis of the nacelle 516. For example, as shown in FIG. 20A, the top cowling 528a can span an angle $\theta_a$ of about 90° about the longitudinal axis of the nacelle 516a, as shown in FIG. 20B, the top cowling 528b can span an angle $\theta_b$ of about 90° about the longitudinal axis of the nacelle 516b, and as shown in FIG. 20C, the top cowling 528c can span an angle $\theta_c$ of about 20° about the longitudinal axis of the nacelle 516c. Thus, an area of the cascade 582 through which the reverse thrust of air 555 passes can vary along with the span of the top cowling 528.

Figure 21:
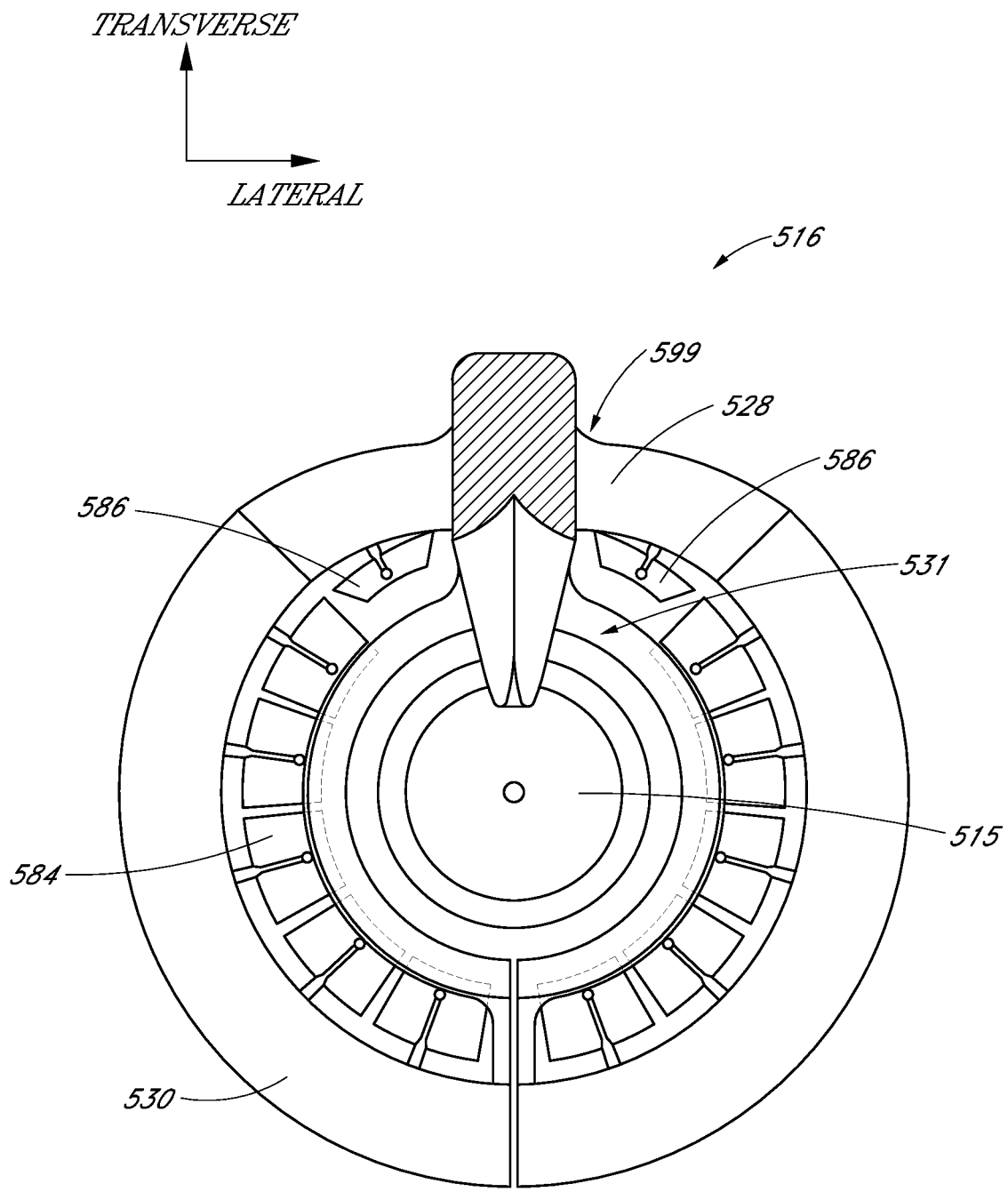
FIG. 21 is a rear view of the nacelle and engine of FIG. 19.

As shown in FIGS. 20A-21, because the cascades 582a, 582b, 582c are not exposed along the top side of the nacelle 516, the nacelle may include upper blocker doors 586a, 586b, 586c that are independently controllable from the other blocker doors 584a, 584b, 584c to allow for air flow to pass through the outlet of the nacelle near the top cowling 528 in order to balance duct pressures within the nacelle. Additionally, the blocker doors 584, 586 may be angled relative to the transverse axis of the nacelle 516 and/or angularly staggered relative to each other about the longitudinal axis of the nacelle. In this way, the blocker doors 584, 586 can allow a portion of bypass airflow that is not diverted through the cascade 582 (e.g., a portion of the bypass airflow that passes directly below the top cowling 528 and is not exposed to the cascade 582) to pass between the blocker doors 584, 586 such that the mass flow of air that bypasses the engine 515 through the inlet 519 is equal to the mass flow of air through the cascade 582 plus the mass flow of air through the outlet 531.

Figure 22:
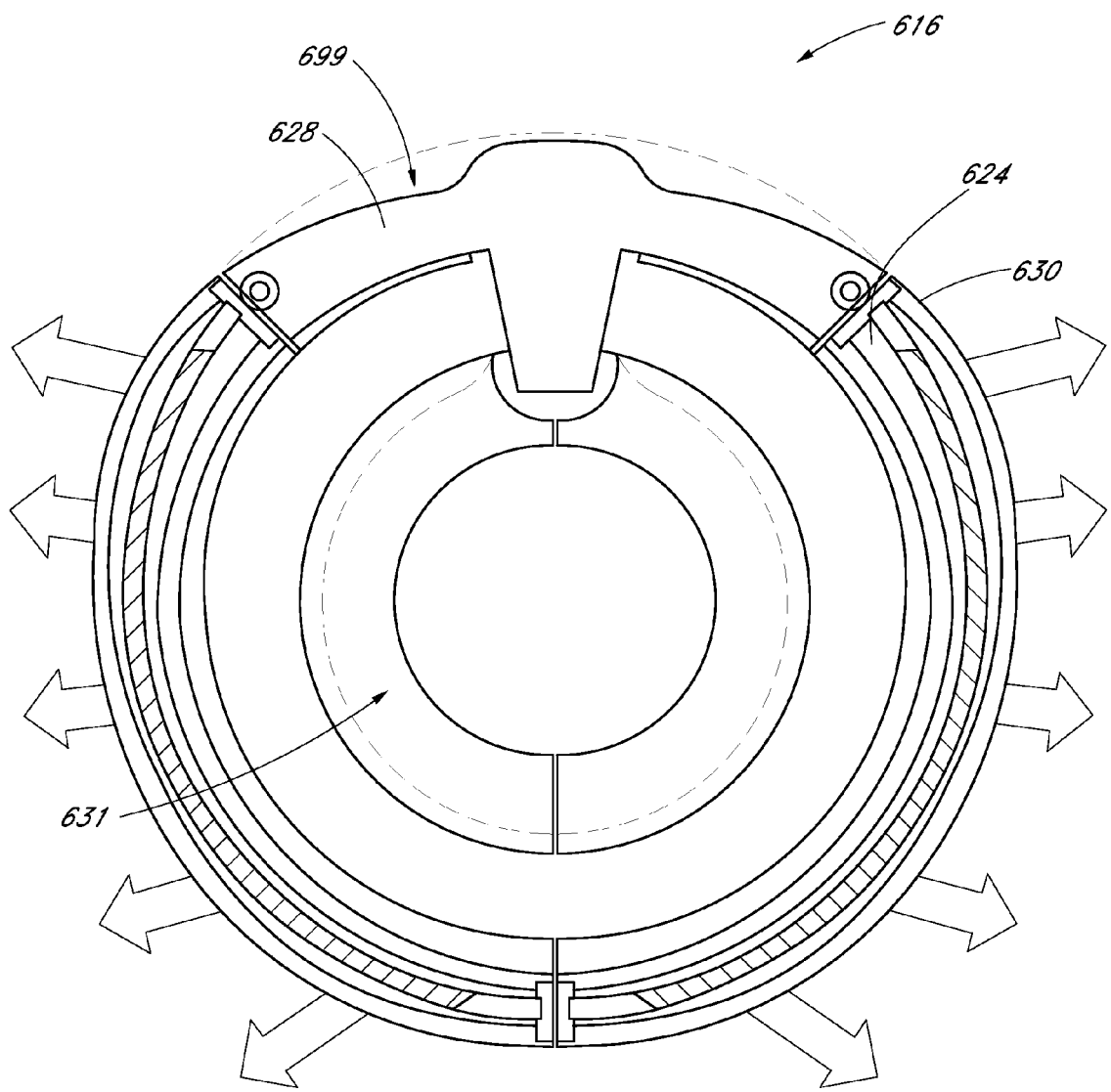
FIG. 22 is a cross-sectional view of an embodiment of a nacelle having a flattened top cowling and an enlarged inlet cowling.

Turning now to FIG. 22, a rear view of an embodiment of a nacelle 616 is schematically depicted. Similar to the nacelle 516 discussed above with reference to FIGS. 15-21, the nacelle 616 includes a top cowling 628 having a flattened surface 699. The nacelle 616 also includes an outlet cowling 630 extending below a portion of the top cowling 628 and partially defining an outlet 631. As compared with the outlet cowling 630 of FIGS. 13-21, the outlet cowling 630 has an enlarged and non-constant (e.g., variable) radius such that the area of the outlet 631 is larger than the area of the outlet 531. In some embodiments, the area of the outlet 631 can be greater than an area of the inlet to the nacelle 616. Increasing the radius of the outlet cowling 630 to enlarge the outlet 631 can increase the area of a cascade exposed to a reverse thrust of air in a reverse thrust configuration. As such, the radius and size of the outlet cowling 630 can be selected depending on reverse thrust requirements without necessitating a split or cascade exposure through the top cowling 628.

Figure 23:
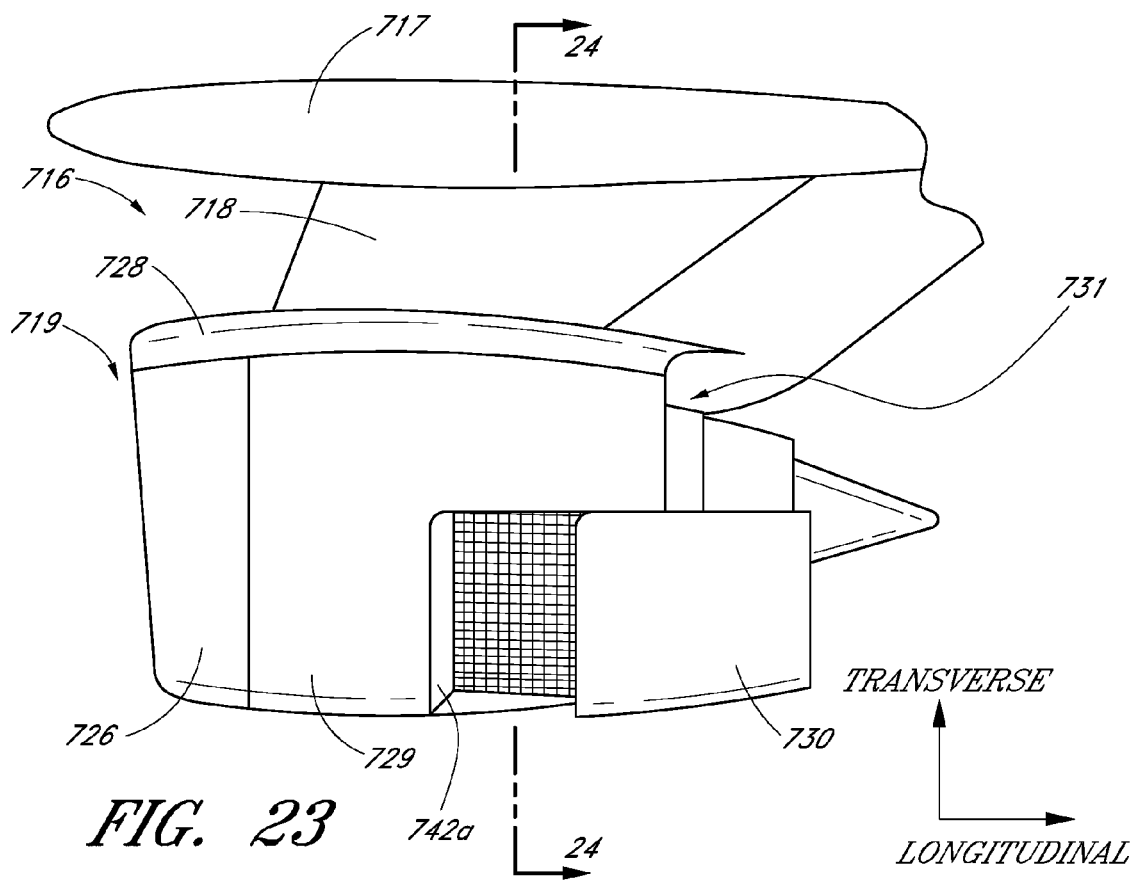
FIG. 23 is a side view of an embodiment of a nacelle in a reverse thrust configuration.
Figure 24:
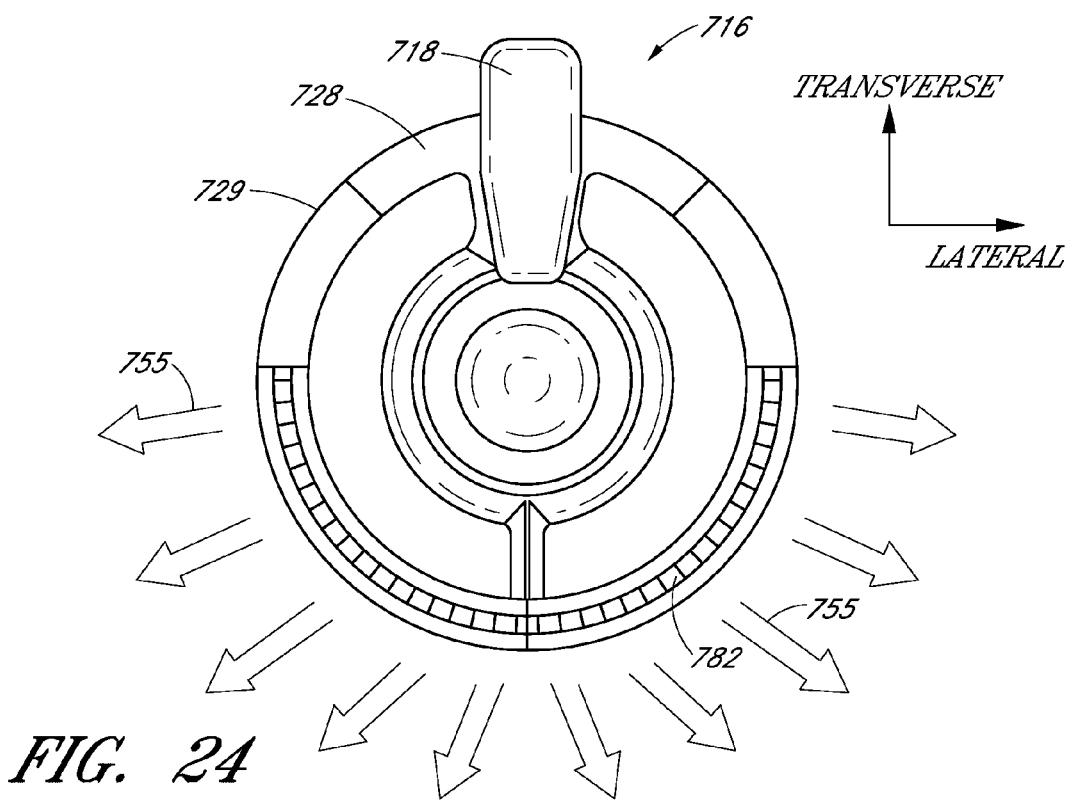
FIG. 24 is a cross-sectional view of the nacelle of FIG. 23 taken along line 24-24.

FIGS. 23 and 24 depict a nacelle 716 according to another embodiment. The nacelle 716 can be coupled to a wing 717 by a pylon 718. In some embodiments, the pylon 718 can be integrally formed with at least one of the wing 717 and the top cowling 728 of the nacelle 716. As with the embodiments discussed above, the top cowling 728 can include an integral or homogeneous portion that extends continuously from a front end or inlet 719 of the nacelle 716 to a rear end or outlet 731 of the nacelle. In this way, the top cowling 728 can be formed without any splits or junctures.

As shown in FIG. 23, the nacelle 716 includes the top cowling 728 which defines an upper quadrant or portion of the nacelle and an inlet cowling 726 which is coupled to a lower side of the top cowling 728. The inlet cowling 726 and the top cowling 728 define the inlet 719 of the nacelle. The nacelle 716 also includes a mid-body cowling 729 which is coupled to a longitudinal side of the inlet cowling 726 and also to a lower side of the top cowling 728. An outlet cowling 730 is coupled to the mid-body cowling 729 and translates longitudinally relative to the top cowling 728, inlet cowling 726, and mid-body cowling 729. Together, the top cowling 728, mid-body cowling 729, and outlet cowling 730 define the outlet 731 of the nacelle 716.

As shown in FIG. 23, a transverse split 742a disposed between the outlet cowling 730 and the mid-body cowling 729 does not extend through the upper half of the mid-body cowling 729 to the top cowling 728 because the span of the outlet cowling 730 is limited to the lower portion of the outlet 731. In this way, a cascade 782 underlying the outlet cowling 730 is only exposed along the lower portion of the nacelle 716 when the outlet cowling 730 is translated in the reverse thrust configuration. Accordingly, the area through which a reverse thrust of air 755 may pass is limited to the lower portion of the nacelle 716 and the magnitude of a resulting reverse thrust force can be limited by this configuration. Although the embodiment illustrated in FIGS. 23 and 24 may result in diminished reverse thrust force as compared with other nacelles, limiting the transverse split 742a to the lower portion of the nacelle 716 can provide aerodynamic advantages as compared with other nacelles. For example, limiting the split 742a to the lower portion of the nacelle distances the split from the wing 717 in the transverse direction. Consequently, perturbations or disturbances induced by the split 742a in a flow of air that passes over the nacelle 716 in the forward configuration do not come into contact or impinge the wing 717 and increase drag on the wing. Thus, the embodiment depicted in FIGS. 23 and 24 illustrates an example of how splits or junctures may be incorporated in a nacelle to limit the drag forces caused by such splits.

The skilled artisan will recognize the interchangeability of various features from different embodiments. Although these techniques and systems have been disclosed in the context of certain embodiments and examples, it will be understood by those skilled in the art that these techniques and systems may be extended beyond the specifically disclosed embodiments to other embodiments and/or uses and obvious modifications and equivalents thereof. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the systems disclosed herein disclosed should not be limited by the particular disclosed embodiments described above.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

What is claimed is:

1. A nacelle having an inlet, an outlet, and a longitudinal axis extending therebetween, the nacelle comprising:
   a first cowling at least partially defining the inlet and at least partially defining the outlet, the first cowling comprising a unitary portion that extends from the inlet to the outlet, wherein the first cowling extends continuously and is splitless;
   a second cowling at least partially defining the outlet, the second cowling being configured to translate relative to the first cowling; and
   a third cowling at least partially defining the inlet, the first cowling and the third cowling abutting one another along a first split and a second split.

2. The nacelle of claim 1, wherein the first cowling spans an angle between about 20° and about 180° about the longitudinal axis.

3. The nacelle of claim 1, further comprising a pylon, the pylon being integral to the first cowling.

4. The nacelle of claim 1, wherein the unitary portion of the first cowling extends continuously from the first split to the second split.

5. A nacelle having a longitudinal axis and configured to be coupled to an underside of a wing so as to form a clearance space therebetween, the nacelle comprising:
   a lip defining an inlet; and
   a first cowling disposed adjacent to the lip and comprising an upper surface with at least two different radii of curvature in a plane perpendicular to the longitudinal axis, the upper surface being adjacent to the underside of the wing, wherein a pylon is integral with the first cowling, wherein integral means formed such that there are no splits found therebetween
   wherein the first cowling comprises a unitary portion that extends continuously between the lip and an outlet of the nacelle,
   wherein the first cowling and a second cowling form the lip.

6. The nacelle of claim 5 further comprising a pylon disposed between the lip and the underside of the wing.

7. The nacelle of claim 5, wherein at least a portion of an outer circumference of the lip is non-circular in a plane perpendicular to the longitudinal axis.

8. The nacelle of claim 5, wherein the upper surface of the first cowling defines a plane parallel to the longitudinal axis and a lateral axis of the nacelle.

9. The nacelle of claim 5, further comprising a second cowling extending below at least a portion of the first cowling.

10. The nacelle of claim 9, wherein a first transverse distance between a portion of the upper surface of the first cowling and the longitudinal axis of the nacelle is different than a second transverse distance between a lower surface of the second cowling and the longitudinal axis.

* * * * *